(12) United States Patent
Plumley et al.

(10) Patent No.: US 12,117,984 B1
(45) Date of Patent: Oct. 15, 2024

(54) SYSTEMS AND METHODS FOR EVENT TRACKING

(71) Applicant: Black Cape Inc., Arlington, VA (US)

(72) Inventors: Evan Plumley, Brightwood, VA (US); Johanna Song, Charlottesville, VA (US); Michael Conaway, Clearwater Beach, FL (US); Daniel Perez, Austin, TX (US); Justin Toman, Pflugerville, TX (US); Samuel Stowers, Springfield, VA (US); Abraham Usher, Herndon, VA (US); Adam Gribble, Lakewood Ranch, FL (US)

(73) Assignee: Black Cape Inc., Arlington, VA (US)

(*) Notice: Subject to any disclaimer, the term of this patent is extended or adjusted under 35 U.S.C. 154(b) by 0 days.

(21) Appl. No.: 18/773,029

(22) Filed: Jul. 15, 2024

Related U.S. Application Data

(63) Continuation-in-part of application No. 18/476,990, filed on Sep. 28, 2023, now Pat. No. 12,038,895, which is a continuation of application No. 18/328,711, filed on Jun. 2, 2023, now Pat. No. 11,797,508.

(51) Int. Cl.
*G06F 16/22* (2019.01)
*G06F 16/242* (2019.01)
*G06F 16/2455* (2019.01)

(52) U.S. Cl.
CPC ...... *G06F 16/2228* (2019.01); *G06F 16/2423* (2019.01); *G06F 16/2455* (2019.01)

(58) Field of Classification Search
CPC ............. G06F 16/2228; G06F 16/2455; G06F 16/2423
USPC ........................................................ 707/743
See application file for complete search history.

(56) References Cited

U.S. PATENT DOCUMENTS

| | | | | |
|---|---|---|---|---|
| 7,168,025 | B1 * | 1/2007 | Berkovich | G06F 16/2255 714/759 |
| 7,698,325 | B1 * | 4/2010 | Ozekinci | G06F 16/2228 707/698 |
| 7,752,211 | B1 * | 7/2010 | Ozekinci | G06F 11/1451 707/778 |
| 7,979,441 | B2 * | 7/2011 | Sim-Tang | G06F 11/1469 707/741 |
| 8,725,705 | B2 * | 5/2014 | Hirsch | G06F 11/1464 707/698 |
| 8,935,487 | B2 * | 1/2015 | Sengupta | G06F 16/137 711/E12.002 |

(Continued)

*Primary Examiner* — Hanh B Thai
(74) *Attorney, Agent, or Firm* — Scale LLP

(57) ABSTRACT

The present system pertains to event tracking, involving the acquisition of event information, generation of compound hashes, and formation of a search data structure. Event information includes time-and-geolocation data and topic data for each event. Compound hashes, comprising a space-time hash and a topic hash for each event, are generated based on this information. A search data structure is formed using these compound hashes, enabling the grouping of spacetime hashes and structuring of topic hashes. Upon receiving a query, the system executes a search based on the query's compound hash or parameters, returning matching event content. The system can also generate semantic descriptions of relevant events using a narrative generation model and predict event relevance using a preferential learning model.

20 Claims, 12 Drawing Sheets

(56) References Cited

U.S. PATENT DOCUMENTS

| | | | |
|---|---|---|---|
| 8,965,901 B2* | 2/2015 | Merriman | G06F 16/2264 707/711 |
| 9,300,471 B2* | 3/2016 | Araki | G06F 16/322 |
| 9,646,036 B2* | 5/2017 | Merriman | G06F 16/2264 |
| 10,572,465 B2* | 2/2020 | Merriman | G06F 16/2255 |
| 10,984,044 B1* | 4/2021 | Batsakis | G06F 16/907 |
| 11,249,999 B2* | 2/2022 | Colgrove | G06F 16/2255 |
| 11,514,014 B2* | 11/2022 | Graefe | G06F 16/2246 |
| 11,516,069 B1* | 11/2022 | Satish | H04L 43/067 |
| 11,550,847 B1* | 1/2023 | Batsakis | G06F 16/90335 |
| 11,709,948 B1* | 7/2023 | Ghetti | G06F 16/2255 713/193 |
| 11,860,940 B1* | 1/2024 | Batsakis | G06F 16/2471 |
| 2003/0074341 A1* | 4/2003 | Blackburn | G06F 16/9014 |
| 2005/0166046 A1* | 7/2005 | Bellovin | H04L 63/0428 713/165 |
| 2008/0205655 A1* | 8/2008 | Wilkins | G06Q 10/10 707/999.005 |
| 2009/0228534 A1* | 9/2009 | Hirsch | G06F 16/2455 711/216 |
| 2009/0271366 A1* | 10/2009 | Ellison | G06F 16/9014 |
| 2011/0225168 A1* | 9/2011 | Burroughs | G06F 15/167 707/747 |
| 2012/0158729 A1* | 6/2012 | Mital | H04L 47/78 707/738 |
| 2013/0031077 A1* | 1/2013 | Liu | G06F 7/02 707/706 |
| 2013/0086004 A1* | 4/2013 | Chao | G06F 21/55 707/E17.007 |
| 2013/0086017 A1* | 4/2013 | Chao | G06F 16/90344 707/698 |
| 2013/0339319 A1* | 12/2013 | Woodward | G06F 11/1461 707/692 |
| 2014/0052999 A1* | 2/2014 | Aissi | G06F 21/64 713/189 |
| 2014/0108362 A1* | 4/2014 | Kim | H03M 7/3084 707/693 |
| 2014/0129530 A1* | 5/2014 | Raufman | G06F 16/901 707/693 |
| 2014/0164352 A1* | 6/2014 | Denninghoff | G06F 16/953 707/711 |
| 2015/0161122 A1* | 6/2015 | Merriman | G06F 16/2255 707/747 |
| 2015/0169751 A1* | 6/2015 | Pennock | G06F 16/9535 707/723 |
| 2015/0261884 A1* | 9/2015 | Pang | H04N 19/30 707/741 |
| 2015/0278277 A1* | 10/2015 | Agrawal | H04W 64/00 707/746 |
| 2015/0317211 A1* | 11/2015 | Barnes | G06F 11/1451 707/646 |
| 2016/0063021 A1* | 3/2016 | Morgan | G06F 16/182 707/754 |
| 2016/0171027 A1* | 6/2016 | Agrawal | G06F 16/90344 707/743 |
| 2016/0188591 A1* | 6/2016 | Bestler | H04L 63/0853 707/744 |
| 2018/0004744 A1* | 1/2018 | Guilford | G06F 16/2255 |
| 2018/0137155 A1* | 5/2018 | Majumdar | G06N 10/00 |
| 2018/0144152 A1* | 5/2018 | Greatwood | H04L 63/123 |
| 2019/0171665 A1* | 6/2019 | Navlakha | G06V 10/761 |
| 2021/0182261 A1* | 6/2021 | Yeo | G06F 21/602 |
| 2021/0224242 A1* | 7/2021 | Hardy-Francis | G06F 16/2282 |
| 2022/0058198 A1* | 2/2022 | Dupont | G06F 21/602 |
| 2022/0138182 A1* | 5/2022 | Yang | G06F 16/245 707/703 |
| 2023/0069458 A1* | 3/2023 | Ulewicz | H04W 12/037 |
| 2023/0385815 A1* | 11/2023 | Jakobsson | G06Q 20/36 |

\* cited by examiner

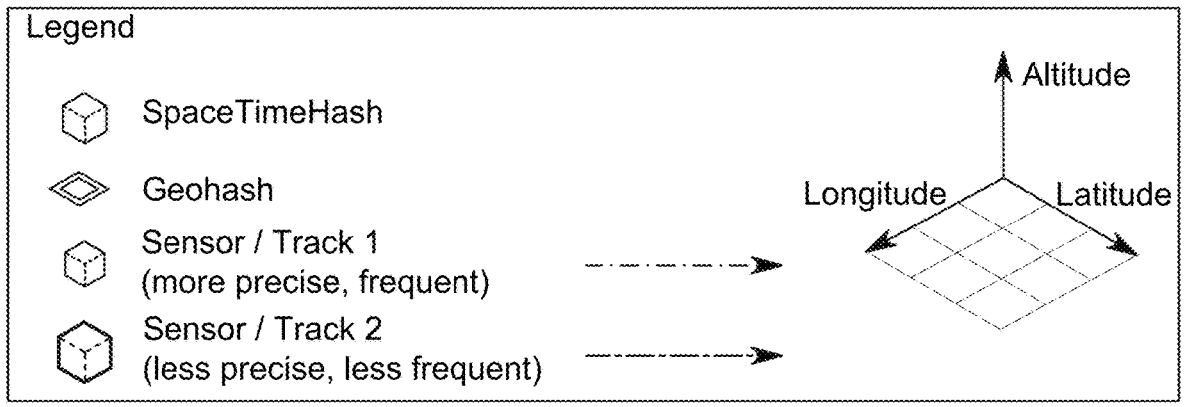
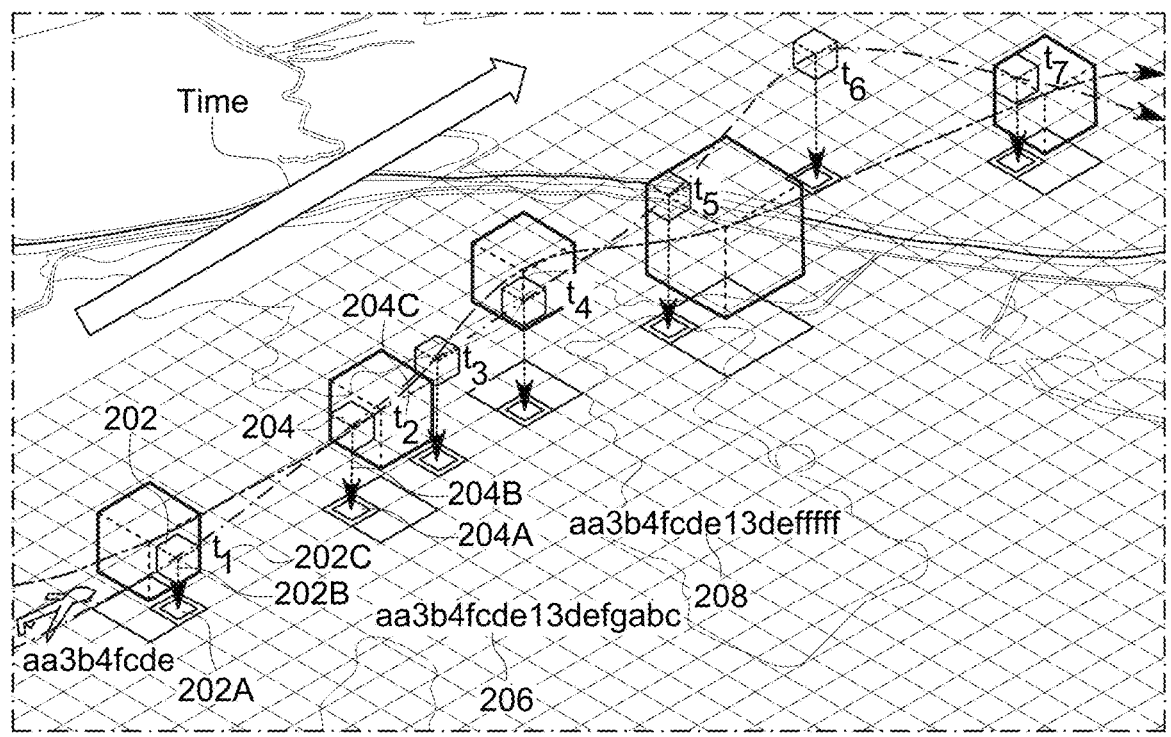
FIG. 2

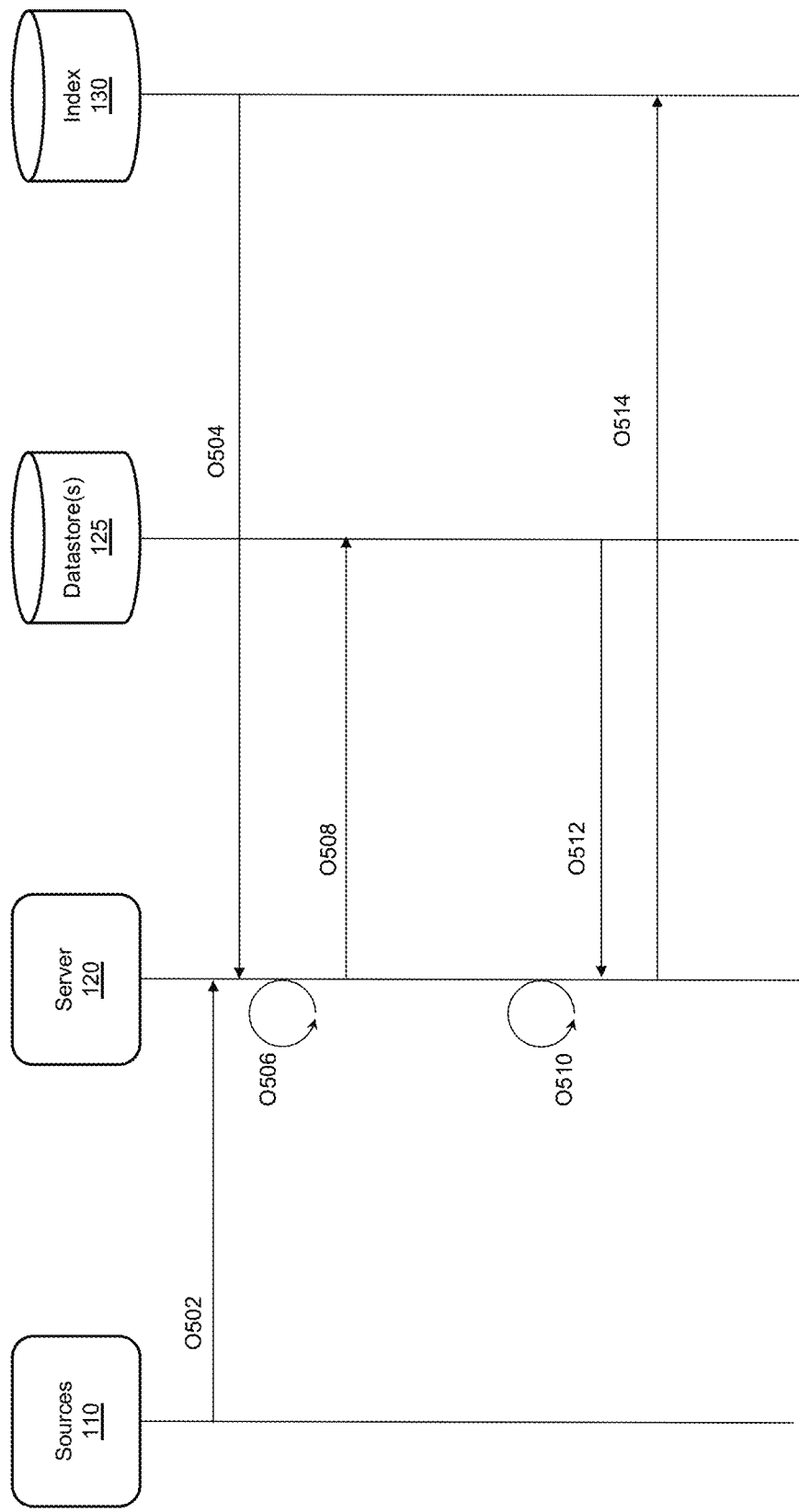

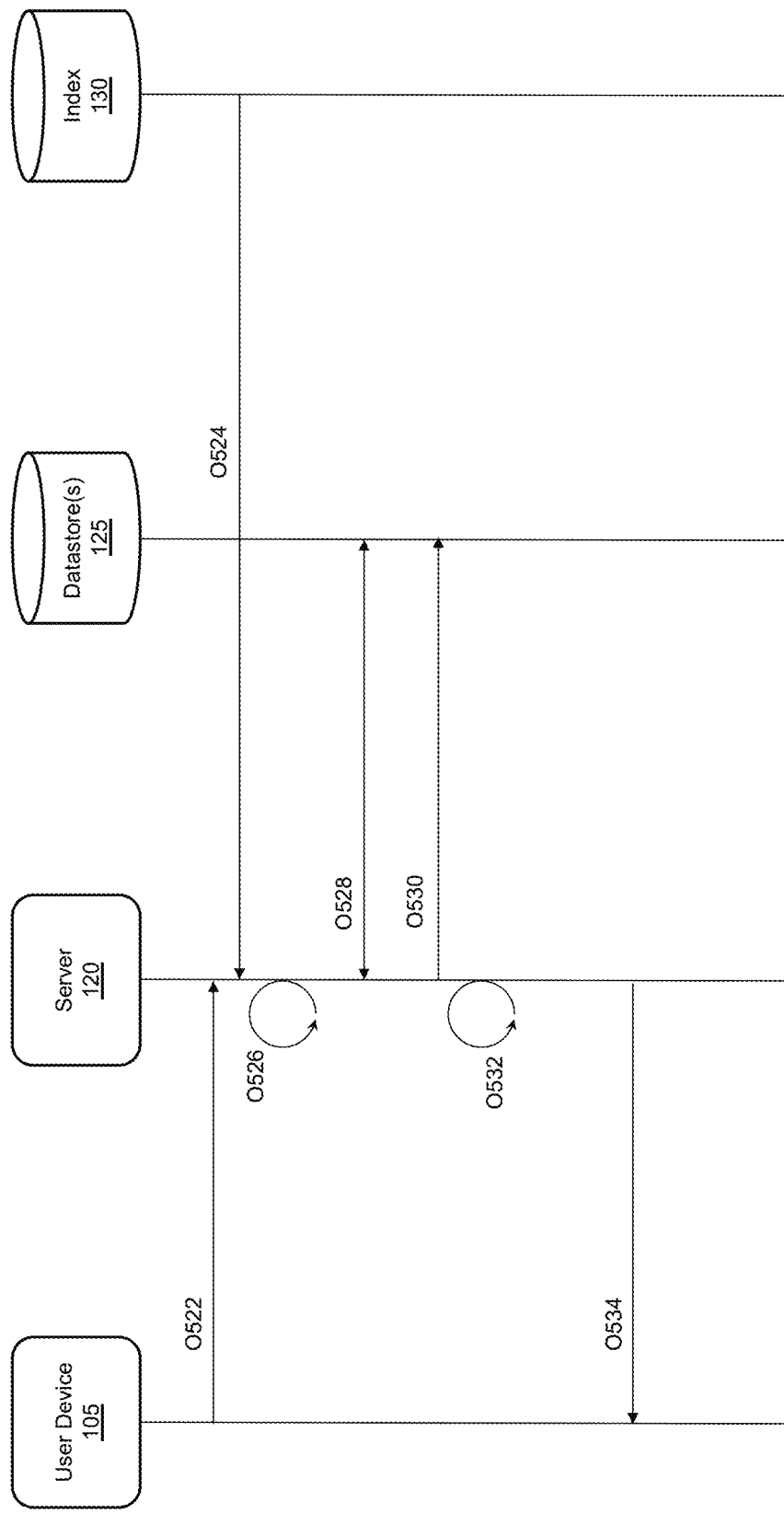

SYSTEMS AND METHODS FOR EVENT TRACKING

CROSS-REFERENCE TO RELATED APPLICATION(S)

This application is a continuation of U.S. application Ser. No. 18/476,990, filed Sep. 28, 2023.

U.S. application Ser. No. 18/476,990, filed Sep. 28, 2023, is a continuation of U.S. application Ser. No. 18/328,711, filed Jun. 2, 2023, now issued as U.S. Pat. No. 11,797,508, on Oct. 24, 2023.

The contents of each of the above referenced applications are hereby incorporated by reference in its entirety.

TECHNICAL FIELD

Various aspects of the present disclosure relate generally to systems and methods for event tracking and, more particularly, to systems and methods for event tracking using geospatial correlation.

BACKGROUND

Generally, the amount of event, report, and information available is increasing due to a number of macro-trends. For instance, social media, news, and digital content have proliferated as digital connection and communication have grown. Moreover, ubiquitous low-cost sensors, smart-cities, and the like all report additional information. There is an increasing desire to automatically detect events of significance using public/private data and/or spatial data, such as for event and/or entity tracking (e.g., packages, taxis, deliveries), national security, and the like. Additionally, governments and industry have a growing interest in fusing data across sources based on correlations and linkages in time and space. However, existing techniques based on clustering algorithms and spatial data search algorithms, are data intensive and relatively slow. Moreover, as a number of records to search through increases to billions or trillions, existing techniques based on clustering algorithms and spatial data search algorithms will get slower or more data intensive.

The present disclosure is directed to overcoming one or more of these above-referenced challenges.

SUMMARY OF THE DISCLOSURE

According to certain aspects of the disclosure, systems, methods, and computer readable memory are disclosed for geospatial correlation.

According to an aspect of the present disclosure, a system for event tracking is provided. The system includes at least one processor and at least one memory configured to store instructions. When executed by the at least one processor, these instructions cause the at least one processor to perform operations. These operations include obtaining event information for a plurality of events, where the event information includes time-and-geolocation data indicating a setting of an event, and topic data indicating a subject of the event. The operations further include generating a plurality of compound hashes based on the plurality of events, where each compound hash includes a spacetime hash and a topic hash for a specific event.

According to other aspects of the present disclosure, the system may include forming a search data structure based on the plurality of compound hashes. The search data structure is configured to group a plurality of spacetime hashes into subsets and structure a plurality of topic hashes in vectors or groups of subsets. The search data structure is also configured to point to a plurality of keys for a plurality of records associated with the event information based on the plurality of compound hashes.

In another aspect of the present disclosure, the system may include operations for executing a query of the search data structure based on a query compound hash and/or query parameters. This includes comparing a query spacetime hash with the plurality of spacetime hashes recorded within the search data structure and comparing a query topic hash with the plurality of topic hashes recorded within the search data structure. In response to the query returning at least one matching keys, the system transmits event content based on the at least one matching keys.

According to another aspect of the present disclosure, the event information may be obtained from a description of an event comprising multimodal data. The multimodal data may include one or combinations of text, image, audio, video, and sensor data. The text may represent unstructured, semi-structured, or structured text data. The system may also include operations for inputting the multimodal data into a multi-model machine learning model or a plurality of machine learning models to determine attributes of an event.

In yet another aspect of the present disclosure, the system may include operations for executing a query of the search data structure that includes selecting a subset of the plurality of compound hashes based on the query spacetime hash, comparing the query topic hash to topic hashes that correspond to the subset, and returning the at least one matching keys in response to the query topic hash matching one or more of the subset.

According to further aspects of the present disclosure, the system may include operations for processing data from records associated with the at least one matching keys using a narrative generation model to generate the event content. The narrative generation model may be configured to generate a semantic description of relevant events as the event content. The system may also include operations for processing the event content using a preferential learning model configured to generate and rank scores for discrete event tokens to predict how relevant an event is to a user.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

FIG. 2 depicts a diagram schematically showing spacetime hashes.

FIG. 5A depicts a block diagram schematically showing operations to generate/update an index.

FIG. 5B depicts a block diagram schematically showing operations to search an index.

DETAILED DESCRIPTION

In general, the present disclosure is directed to methods and systems for event and geospatial correlation using an index of spacetime hashes and topic hashes. As discussed in detail herein, systems of the present disclosure may receive inbound events/observations/records and determine if any correlate to existing events/observations/records by searching an index. To search the index, the systems may encode the plurality of events/observations/records into a plurality of hashes and search the index for matching hashes. Hashes provide a fuzzy, scalable data format to perform same-concept and same-time-and-place determinations between events/observations/records because hashes may encode concepts into a string of characters or a feature space vector, or hashes may encode spatial-temporal data into a string of characters. In some cases, hashes may provide at least an order of magnitude search speed improvement as compared to clustering algorithms or other search algorithms, especially as the number of events/observations/records increase to billions or trillions.

Thus, methods and systems of the present disclosure may be improvements to computer technology and/or geospatial/event correlation.

1. Geospatial Correlation

Figure 1:
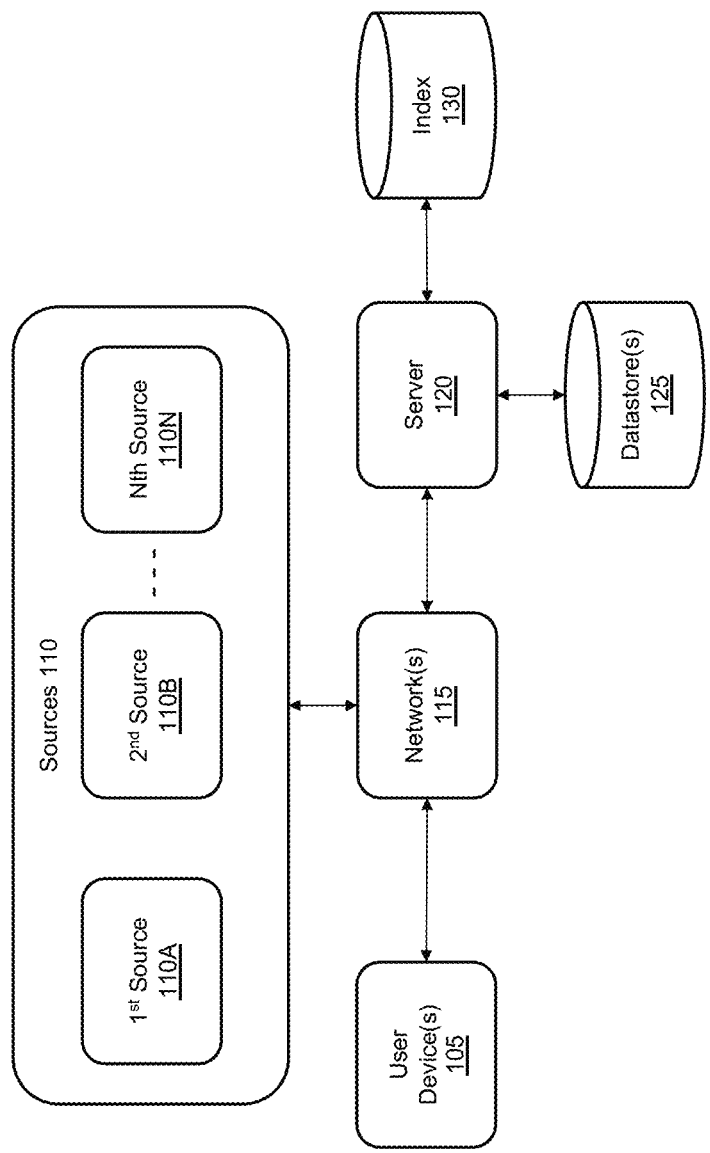
FIG. 1 depicts an example environment for geospatial correlation.

FIG. 1 depicts an example environment 100 for geospatial correlation. The environment 100 may include user device(s) 105, sources 110, network(s) 115, a server 120, datastore(s) 125, and an index 130. The server 120 may (1) receive, coordinate, and manage records from the sources 110 in the datastore(s) 125, and (2) perform queries (e.g., from user device(s) 105) to return data about or from records stored in the datastore(s) 125. In some cases, the server 120 may search the index 130 to return results faster. Generally, the index 130 includes a search data structure that is generated based on spacetime hashes associated with records in the datastore(s) 125. In some cases, the server 120 may search the index 130 and/or the datastore(s) 125 to return results at different levels of retrieval speed and/or confidence level.

The user device(s) 105 (hereinafter "user device 105" for ease of reference) may be a personal computing device, such as a cell phone, a tablet, a laptop, or a desktop computer. In some cases, the user device 105 may be an extended reality (XR) device, such as a virtual reality device, an argument reality device, a mixed reality device, and the like. In some cases, the user device 105 may be associated with a user (e.g., an end user) of services provided by the server 120 (e.g., entity tracking, co-traveler tracking, and the like). The user may have a user account associated with the user device 104/server 120 that uniquely identifies the user.

The sources 110 may obtain observations from observation devices (or from datastore(s) associated with observation devices), and the sources 110 may provide the observations to the server 120 as records. The sources 110 may include a plurality of sources, such as a first source 110A, a second source 110B, . . . and an nth source 110N. Each of the sources 110 may be associated with a set of observation devices. Each set of observation devices may be unique to a source, or different sources 110 may having sets of observation devices that share common observation devices. The sources 110 may report observations of the same or different entities, based on the modality of the observation devices, the range of observations devise, or region of focus of observation devices. Observation devices may be any type of device that determines geospatial data (and time data) as an entity exists in or moves through an environment. In some cases, the observation devices may be a part of the entity (e.g., a GPS system incorporated into a vehicle or cell phone). In some cases, the observation devices may sense, track, and determine geospatial data for the entity (e.g., imaging, electromagnetic communications (e.g., between a cell tower and a cellular modem, a WIFI router and WIFI modem, and the like), electromagnetic radiation (e.g., radar/lidar), sonar, and the like).

The network(s) 115 may include one or more local networks, private networks, enterprise networks, public networks (such as the internet), cellular networks, and satellite networks, to connect the various devices in the environment 100. Generally, the various devices of the environment 100 may communicate over network(s) 115 using, e.g., network communication standards that connect endpoints corresponding to the various devices of the environment 100.

The server 120 may be a personal computer device, a server, a system of servers, a set of compute instances in the cloud (e.g., provided by a cloud service provider), and the like. The server 120 may, as discussed herein, (1) receive, coordinate, and manage records from the sources 110 in the datastore(s) 125, and (2) perform queries (e.g., from user device(s) 105) to return data about or from records stored in the datastore(s) 125.

In certain aspects, the server 120 may host and execute a records management application. In some cases, the records management application may receive inbound records from sources 110; determine correlations of inbound records, if any, with existing records of the datastore(s) 125; and store the inbound records (e.g., as new records or fused records). In some cases, the records management application may update (or replace) a search data structure of the index 130 based on the inbound records being stored.

In certain aspects, the server 120 may host and execute a query application (e.g., an API application and/or a server-side application corresponding to a browser program, a mobile application, a desktop application, and the like on the user device 105) so that query messages may be received, processed, stored, and responded to with query responses. The server 120 may store relevant data (e.g., a search data structure) locally, such as in a cache, to determine query responses. In some cases, the server 120 may provide graphical user interfaces, so that end users using user devices 105 may generate query messages and view query responses. In some cases, the server 120 may host API endpoints of the API application to process query responses from user devices 105 and provide query responses to the user devices 105, which may process and use data of the query responses to display data of the query response, update values associated with entities of the query response, or determine actions, statuses, and like.

The datastore(s) 125 may be a structured or unstructured database or other data storage system (e.g., time series database, a data lake, etc.). The datastore(s) 125 may store records regarding entities. In response to instructions from the server 120, the datastore(s) 125 may add new records, update records (e.g., fuse data or two or more records), delete records, or move records. The datastore(s) 125 may store records (in various tables or data structures), in different secure methodologies based on sensitivity, etc. In some cases, the datastore(s) 125 may include at least a record datastore. In some cases, the datastore(s) 125 may also include an ID datastore and a metadata datastore for multi-tiered searches, to support tiered query functionality (e.g., fast response versus higher confidence, or based on incomplete data) of the server 120.

The index 130 may be a data structure that stores at least one search data structure, discussed below with respect to FIGS. 4 and 5. While the index 130 is depicted separate from the server 120, the index 130 may be a part of the server 120 or hosted separately on a dedicated server (or cloud compute instance). In some cases, the index 130 may store and manage different types and/or versions of search data structures.

In some cases, the server 120 may start with a plurality of records, and without a search data structure in the index 130. In this case, the server 120 may generate an index from the existing plurality of records (e.g., from the datastore(s) 125). In some cases, the server 120 may receive records (e.g., in real-time or in batches from sources 110) and update an existing search data structure of the index 130 or generate a new search data structure for the index 130 (to replace the existing search data structure). In some cases, the server 120 may use the older version of the search data structure while the update/generation of a new search data structure is performed.

In some cases, the server 120 may obtain a plurality of records from the datastore(s) 125, to generate (for the first time) or update/generate a new search data structure. In some cases, each record of the plurality of records has a key value that points to the record in a database/data store of the datastore(s) 125. In some cases, each of the plurality of records includes at least data for at least one observation of an entity. In some cases, the key value is unique (e.g., the key value indicates a specific record in a datastore). In some cases, the key value is an entity ID (e.g., a person ID, a device ID, and the like) and the key value is not unique (e.g., the key values points to all records associated with the entity ID in the datastore). In some cases, each observation of has a spacetime hash stored in association with it. As a non-limiting example, Table 1 of Records below of a datastore 125 may store observation data, including key value(s), spacetime hashes, spatial-temporal data (e.g., latitude, longitude, altitude, and time), and metadata of the observation.

TABLE 1

Example Records

| Key Value | Spacetime Hash | Spatial-Temporal Data | Metadata #1 | ... | Metadata #2 |
|---|---|---|---|---|---|
| 000001 | aa3b4fcde13defgabc | Lat1, long1, Atl1, t1 | Source 1 | ... | Latency 1 |
| ... | ... | ... | ... | ... | ... |
| 100001 | aa3b4fcde13defffff | LatN, LongN, AtlN, tN | Source N | ... | Latency N |

To generate the index based on the plurality of records, the server 120 may determine a plurality of observations based on the plurality of records. For instance, the server 120 may merge duplicate observations from two or more existing records (if this is the first time generating the index) and/or merge duplicate observations of inbound records (if this is an update cycle). In some cases, an observation, for index generation purposes, includes at least a key value (e.g., entity ID or device ID) and time-and-geolocation data (e.g., geospatial data, altitude data, and time data from an observation device) for a record of the plurality of records.

The server 120 may encode the plurality of observations into a plurality of spacetime hashes. For instance, the server 120 may encode the time-and-geolocation data (e.g., into a spacetime hash), as discussed herein. In some cases, the server 120 may encode the observations and store the spacetime hashes in the datastore 125 (if the index has not been generated before) or the server 120 may encode the observations during inbound record ingest (if this is an update cycle), and any new or fused record will store the spacetime hash.

To generate the index, the server 120 may form a search data structure of the index for a plurality of key values based on the plurality of spacetime hashes. Generally, as discussed herein, the search data structure groups subsets of the plurality of spacetime hashes into different groups. See, e.g., FIGS. 4 and 5.

After the index is generated (for the first time) or after it is updated or re-generated (in an update cycle), the server 120 may process query messages using the index (or updated/re-generated index). For instance, the server 120 may receive a query message from a user device 105 regarding an entity of interest, and execute a search of the index based on the query message. In response to the search of the index returning at least one matching key value, the server 120 may transmit to the user device 105 a query response based on the at least one matching key value. Generally, the query message may include a query in a defined format (e.g., in accordance with an API design or based on user inputs via a graphical user interface). Additionally, the query response may include at least a Boolean value (e.g., true for search returned a match), or the matching key value. In some cases, the query response may include additional data, such as (some or all) records associated with the matching key value.

In some cases, to execute a search of the index based on the query message, the server 120 may parse a query of the query message and extract search parameters and at least one of (1) a device ID (or key value/entity ID) or (2) time-and-geolocation data of an entity of interest. In some cases, the query may include only a device ID of the entity or include only time-and-geolocation data of the entity. In some cases, the query message may include a set of time-and-geolocation data (e.g., for several observations, for several entities). In some cases, the query message may include a set of device IDs.

Next, the server 120 may obtain an encoded spacetime hash for a search based on the device ID or the time-and-geolocation data of the entity of interest. Likewise, in the case of a set of device IDs or a set of time-and-geolocation data, the server 120 may obtain corresponding sets of encoded spacetime hashes. In the case of time-and-geolocation data, the server 120 may encode the relevant data into a spacetime hash. In the case of device IDs, the server 120 may search the datastore(s) 125 for records that match the device IDs, retrieve corresponding time-and-geolocation data, and encode the retrieved time-and-geolocation data.

Next, the server 120 may execute a search of the index in accordance with the search parameters of the query and the spacetime hash. Likewise, in the case of a set of device IDs or a set of time-and-geolocation data, the server 120 may search of the index in accordance with the search parameters of the query and the sets of encoded spacetime hashes.

In some cases, the search parameters may include one or combinations of: a variable precision indicator, and/or a relaxation parameter. The variable precision indicator (if included in the query message) indicates to the server 120 to use a search data structure configured to handle variable precision searching (e.g., a trie). In this case, the server 120 may, if no key values are returned on a first pass (e.g., no node matches a spacetime hash string at lowest level of resolution), iteratively (for a number of iterations) remove a trailing character from the spacetime hash string and re-search the trie until a key value is returned (e.g., a node matches the modified spacetime hash) or the set of iterations has ended (e.g., no match is found). The relation parameter may be user-defined or set by a user's organization (e.g., based on context), and the relation parameter may set the number of iterations that the trailing character is removed from the spacetime hash string (thus, changing geohash scale, altitude hash scale, and/or time hash scale (or all three at once)).

In some cases, the query response may include the at least one matching key value and/or data retrieved from the datastore(s) 125 based on the at least one matching key value. In some cases, the query response indicates a correlation between the entity of interest and entity(s) associated with the at least one matching key value. In this case, the entity(s) associated with the matching key value may be determined to be co-travelers of the entity of interest or are determined to be the entity of interest. For instance, the server 120 may perform an analysis of device IDs and/or metadata of the observations to distinguish or confirm the entities of both records as separate (e.g., co-travelers) or the same entity (e.g., duplicate observations).

To perform the analysis of device IDs, the server 120 may determine an identifier (e.g., device ID) of the entity of interest (e.g., based on metadata in the inbound record from sources), retrieve identify(s) (from the datastore(s) 125) associated with the at least one matching key value, and determine whether the identifier matches identify(s) associated with the at least one matching key value. In this manner, spacetime hashes may accurately and quickly determine two observations for entities at a same region and time (at the relevant resolution of the hierarchical of the spacetime hash), and the confirm whether the entities are the same or not (e.g., based on device ID or metadata).

To perform the analysis of the metadata, the server 120 may determine metadata of the entity of interest correlates to metadata associated with the at least one matching key value. For instance, the server 120 may retrieve metadata of the entity of interest (e.g., based on metadata in the inbound record from sources), retrieve sets of metadata (from the datastore(s) 125) associated with the at least one matching key value, and determine whether the metadata correlates to one or more metadata sets associated with the at least one matching key value. Generally, correlating metadata sets may determine two sets of metadata match if correlation conditions are satisfied. Correlation conditions may be if specific portions of metadata match, if a threshold number of metadata portions match, if entity distinguishing features of metadata match, and the like.

In the case that the entity of interest is determined to be the same as the entity of the matching key value, the server 120 may fuse observation data of the at least one matching key value and observation data associated with the entity of interest (e.g., no new record is formed and the existing record is updated with the inbound record, as this is a duplicate observation). In the case that the entity of interest is not determined to be the same as an entity of the matching key value, the server 120 may (1) generate and store a new record for observation data associated with the entity of interest (e.g., so the entity of interest is recorded at this spacetime hash in a record), and/or (2) fuse at least some data of observation data associated with the entity of interest to observation data of the at least one matching key value (e.g., to add context to the existing record).

In some cases, the search data structure is a trie or a bitmap. See FIGS. 3 and 4. In some cases, the server 120 may select one of the trie or the bitmap to use for a search. In some cases, the server 120 may select a version of the trie or bitmap (e.g., based on time window/region of search). In some cases, when the query message requests variable precision in the query parameters of the query message, the server 120 may select the trie for the search of the index. In some cases, when the query message requests fixed precision in the query parameters of the query message, the server 120 may select the bitmap for the search of the index.

1.A. Spacetime Hashes

FIG. 2 depicts a diagram 200 schematically showing spacetime hashes. The features of the diagram 200 schematically showing the spacetime hashes of FIG. 2 may apply to FIGS. 1, 3, 4, 5A and 5B. The diagram 200 depicts, as an example, a plurality of observations for an entity over time, and how spacetime hashes are determined for the plurality of observations. The plurality of observations may include many observations (e.g., tens, hundreds, thousands, or millions over many different ranges of time), but for ease of reference a first observation 202 and a second observation 204 are labeled in FIG. 2. The server 120 may determine a first spacetime hash 206 for the first observation 202 and a second spacetime hash 208 for the second observation 204.

The first observation 202 and the second observation 204 may include at least first geospatial data 202A and second geospatial data 204A, first altitude data 202B and second altitude data 204B, and first time data 202C and second time data 204C. The geospatial data may indicate a latitude and longitude. The altitude data may indicate a distance above (or below) mean sea level. The geospatial data and/or the altitude data may be generated using an observation device that uses one or more of GPS/GNSS processes, signal triangulation processes, localization processes, scanner (e.g., sonar, radar, lidar, and the like) tracking processes, and the like. The time data may indicate a time and date in a standard format. The source 110 (such as first source 110A) may obtain the observations 202 and 204 from the observation device (or from a datastore associated with the observation device), and the source 110 may provide the observations 202 and 204 to the server 120 as records. The server 120 may, as discussed herein, process and manage the records in the datastore(s) 125.

In some cases, the observations 202 and 204 (or the records, as the source 110 may add additional information) may include additional data, such as one or combinations of: metadata of an entity, source, source precision, observation type, and/or observation precision. Metadata of the entity may include entity ID, entity type, organization of the entity, and the like. The source may indicate a system (such as the first source 110A, by a source ID for the first source 110A) that provided the geospatial data, altitude data, and time data to the server 120. The source precision may indicate level of precision generally associated with the source (e.g., if fixed or average). The observation type may indicate a type of observation device that generated the geospatial data, altitude data, and time data. The observation precision may indicate a level of precision generally associated with the observation type, a level of precision for the geospatial data, altitude data, and time data, and/or a level of confidence for the precision (e.g., due to GPS signal, radar reading, cell phone signal, and the like).

In some cases, the spacetime hash may be based on the geospatial data, altitude data, and time data. For instance, the spacetime hash may be based on a geohash, a time hash, and an altitude hash.

A geohash is an encoding of a location into an alpha-numeric hash. In some cases, a geohash is a two-dimensional gridding technique that encodes a precise location (e.g., in latitude and longitude) on the Earth as a two-dimensional grid cell using a variable length string (e.g., alphanumeric text, such ASCII). The string may correspond to a grid cell with a user-defined desired level of precision or allowed error. The length of the string may determine the precision of the grid/maximum error and corresponding cell size. In some cases, the two-dimensional grid is hierarchical. A hierarchical geohash may obtain smaller (more precise) or larger (less precise) grid cells that are children or parents of a current cell, respectively, by adding or removing characters from a string of the current cell. In some cases, a grid cell may contain a defined number (e.g., 32) of smaller and more precise child grid cells. For instance, the precision may range from 5000 kilometers at a string length one to 19 meters at string length 8, to sub-centimeters at longer string lengths. In some cases, the hierarchical geohash may be useful for counting/tracking observations and measuring observations at city, neighborhood, facility, and sub-facility levels.

A time hash is an encoding of a time and date into an alpha-numeric hash. In some cases, the time hash is a temporal binning technique for encoding a precise time as a fuzzy time interval using a variable length string. Like the geohash, the time hash may be a hierarchical time hash, such the length of the string determines precision. For instance, the hierarchical time hash may obtain smaller (more precise) or larger (less precise) time intervals that are children or parents of a current time interval, respectively, by adding or removing characters from a string of the current time interval. In some cases, each time interval of a time hash may contain a predetermined number (e.g., eight) child time intervals with smaller and more precise time intervals. For instance, the time intervals may range from sixteen year intervals down to fractions of a second.

An altitude hash is an encoding of altitude into an alpha-numeric hash. In some cases, the altitude hash is a range binning technique for encoding a precise altitude as a fuzzy altitude interval using a variable length string. Like the geohash, the altitude hash may be a hierarchical altitude hash, such the length of the string determines precision. For instance, the hierarchical altitude hash may obtain smaller (more precise) or larger (less precise) altitude intervals that are children or parents of a current altitude interval, respectively, by adding or removing characters from a string of the current altitude interval. In some cases, each altitude interval of an altitude hash may contain a predetermined number (e.g., 4) child altitude intervals with smaller and more precise altitude intervals. For instance, the altitude intervals may range from a kilometer (or kilometers) interval down to sub-centimeters interval.

In some cases, the spacetime hash may include the geohash, the time hash, and the altitude hash concatenated in sequence. In some cases, the geohash is first in the sequence, the time hash is second in the sequence, and the altitude hash is third in the sequence. Generally, the geohash, the time hash, and the altitude hash may be concatenated in a defined sequence (e.g., any of the six permutations of arranging the three hashes)

In some cases, the spacetime hash may include the geohash, the time hash, and the altitude hash interleaved in a defined sequence. For instance, the defined sequence may include a first set of space bits for a first subset of the geohash, a first set of time bits for a first subset of the time hash, and a first set of altitude bits for a first subset of the altitude hash in sequence before a second set of space bits, a second set of time bits, or a second set of altitude bits. Generally, the geohash, the time hash, and the altitude hash may be interleaved such that subsets of a first hash (e.g., the geohash) are spaced apart from other subsets of the first hash by at least one subset of a second hash (e.g., the time hash).

In some cases, the server 120 may use a four-dimensional spacetime hash (e.g., is a string that combines a geohash, altitude hash, and time hash), to produce a string value representing an entity's position in fuzzy three-dimensional space over time. In some cases, interleaving the geohash, the altitude hash, and the time hash characters may enable the spacetime hash to behave hierarchically, where adding and removing characters adjusts the precision of the space/time resolution. Thus, the use of spacetime hashes may enable rapidly exposing "same place and time" relationships between observations (e.g., data points) of varying precision. A benefit of the spacetime hashes (e.g., versus more traditional clustering algorithms and spatial data search algorithms) is the speed of searching strings (or bits). For instance, the server 120 may search a search data structure of the index 130 to rapidly determine if a matching string (or bit) exists in the search data structure.

In some cases, spacetime hashes have a property that makes them useful for variable precision geospatial analysis. For instance, for a given region and time window represented by a spacetime hash, all geohashes, altitude hashes, and time hashes contained within that region and time window begin with the same leading string (e.g., the spacetime hash's geohash, altitude hash, and time hash).

In some cases, using spacetime hashes also simplifies handling latency and stale data. The server 120 may (e.g., automatically, or as a search parameter of a query message) define a time hash interval beyond which observations (e.g., of records) should not be considered for correlation (e.g., the observations are too stale). For example, defining a time hash window with a precision of 10 may limit a lookback period to certain amount of time (e.g., 4 seconds), whereas a precision of 9 would increase the time window to a larger amount of time (e.g., 30 seconds).

In some cases, using spacetime hashes enables the server 120 to store the observations once and adjust an analytic region resolution and/or temporal resolution at query, based on availability of observations at a given region/time window.

1.B. Trie and Bitmap Search Data Structures

Figure 3:
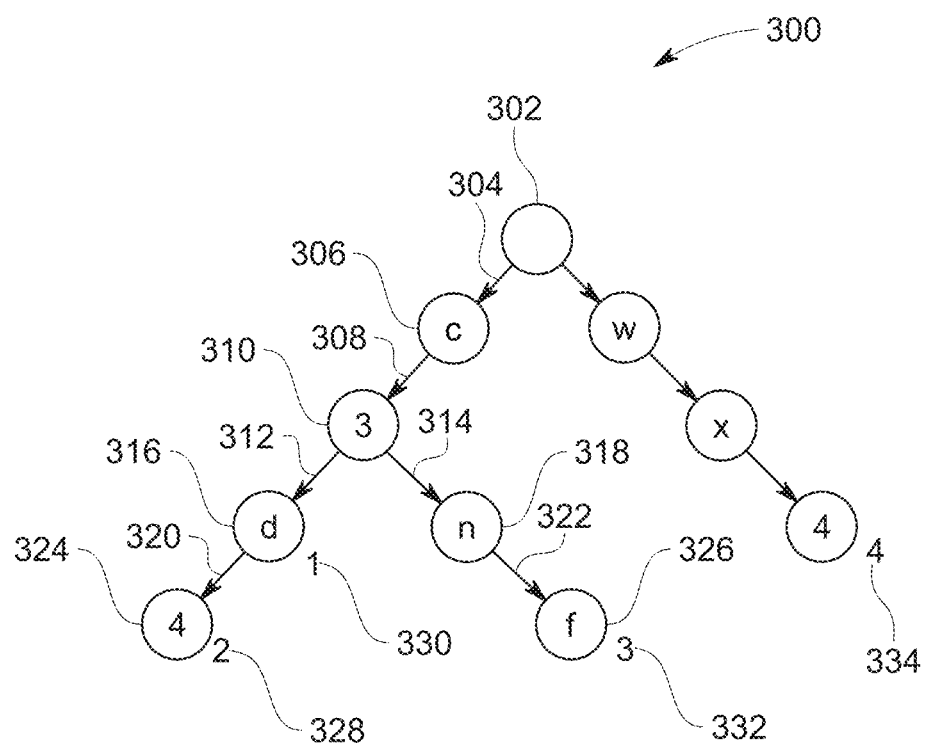
FIG. 3 depicts a first type of a search data structure for an index.

FIG. 3 depicts a first type of a search data structure 300 for an index. The features of the first type of search data structure 300 for the index of FIG. 3 may apply to FIGS. 1, 2, 5A and 5B. In some cases, the first type of the search data structure 300 may be a trie data structure. In some cases, the trie data structure may be a MARISA-Trie, Patricia Trie, directed acyclic word graph (DAWG), and/or Static Double Array Trie. In general, the trie data structure may be a static trie (e.g., the trie needs to be rebuilt every time a new data point is added) or a dynamic trie (e.g., can be updated with new data without being re-built). Static tries tend to be much more memory efficient at the cost of slower updates of new data. The trie data structure may be configured to group key values/spacetime hashes in nodes of the trie data structure. The arrangement (e.g., sequence of nodes and links between nodes) of the trie data structure may be defined based on the spacetime hashes of observations. For instance, each string of a spacetime hash may correspond to a sequence of nodes connected by links, where the sequence nodes correspond to individual characters of the string (e.g., in ASCII) and the links point to children nodes, and so on, and the last character of string corresponds to a node where a key value is stored for that spacetime hash. Thus, the trie data structure groups subsets of spacetime hashes within nodes of branches of the tree structure based on the value of the spacetime hashes.

As a non-limiting exemplary demonstration, FIG. 3 depicts a trie data structure 300 that has a root node 302 and a first set of child nodes (in this case, with links between the root node and nodes associated with characters "c" and "w"), a plurality of grand-children nodes (child nodes of the first set of child nodes) with links between child nodes and grand-children, and the like. The plurality of child nodes may correspond to first indexed characters (that is first character of a string) of all spacetime hashes to be searched for this trie data structure. For ease of reference, the disclosure will describe one branch of nodes below the root node 302 corresponding to a first link 304 to a first node 306 of the first set of child nodes. The first node 306 may have another link 308 that connects the first node 306 and a second node 310. The second node 310 may have a second set of child nodes (e.g., in this case, two nodes). The second set of child nodes may include a third node 316 (with a link 312 connecting the second node 310 and the third node 316) and a fourth node 318 (with a link 314 connecting the second node 310 and the fourth node 318). In some cases, some nodes (such as node 326 with link 322 to fourth node 318) may store key values, such as 328, 330, 332, 334 (e.g., the third node 316, and the like), while some nodes may be empty (e.g., the second node 310). In some cases, only terminus nodes (e.g., nodes with no children) may store key values, as all spacetime hashes may have a same number of characters in their strings. In some cases, any node (except a root node 302) may store key values, as the number of characters in the spacetime hashes may vary. See, for example, a third node 316 that stores key values but also has children nodes.

The server 120 may update the trie data structure by adding nodes (and links to parent/children notes), or add key values to nodes. The server 120 may add nodes as new observations/records are added to the data datastore(s) 125, if the new observations/records do not map to an existing sequence of nodes. In the case that the new observations/records do map to an existing sequence of nodes, the server 120 may update the stored key values in the last node of the sequence of nodes to include the new key values.

In some cases, the server 120 may generate/maintain multiple different versions of the trie data structure. For instance, a first version may be a global version (e.g., to include all observations/records), a second version may be focused on a certain time window, a third version may be focused on observations/records for a specific region, and the like. In this manner, the server 120 may perform searches using specialized trie data structures on more limited datasets, to reduce computation resource and/or time. For instance, the search parameters may indicate the search should only cover North America, so the server 120 may select a North America trie data structure.

In some cases, the server 120 may remove nodes or key values from nodes. For instance, as data becomes stale (e.g., for a trie that is designed to find observations/records for a time window, such as the last day, week, or year), the server 120 may remove nodes if those nodes store key values that correspond to time data outside the window. Additionally, the server 120 may remove key values from nodes if the key values correspond to time data outside the window. In some cases, the server 120 may not remove nodes if at least one key value/spacetime hash maps to the node (e.g., unless the time window has changed).

To search the trie data structure, the server 120 may traverse the trie data structure in accordance with the spacetime hash of entity of interest. For instance, the server 120 may, starting at the root node 302, recursively determine a link to a child node that matches a successively indexed character from a string of the spacetime hash, and determine a matching node in response to indexing a last character of the string. As an example for the string "c3d," the server 120 may index the first character of the spacetime hash ("c"), then index the second character ("3"), then index the third character ("d"), then determine the third node 316 is a matching node and its key values 330 are matching key values. The server 120 may then retrieve a key value for the matching node.

In some cases, the server 120 may determine any deeper nodes below the matching node; and retrieve key values from the matching node and, if any, deeper nodes. As an example for the string "c3d," the server 120 may index the first character of the spacetime hash ("c"), then index the second character ("3"), then index the third character ("d"), then determine the third node 316 is a matching node and its key values 330 and key values 328 of deeper nodes 324 are matching key values. In this manner, trie data structure and the hierarchical structure of spacetime hashes may enable rapid determinations of any observations/records that are within a fuzzy 4-d region-time domain.

Figure 4:
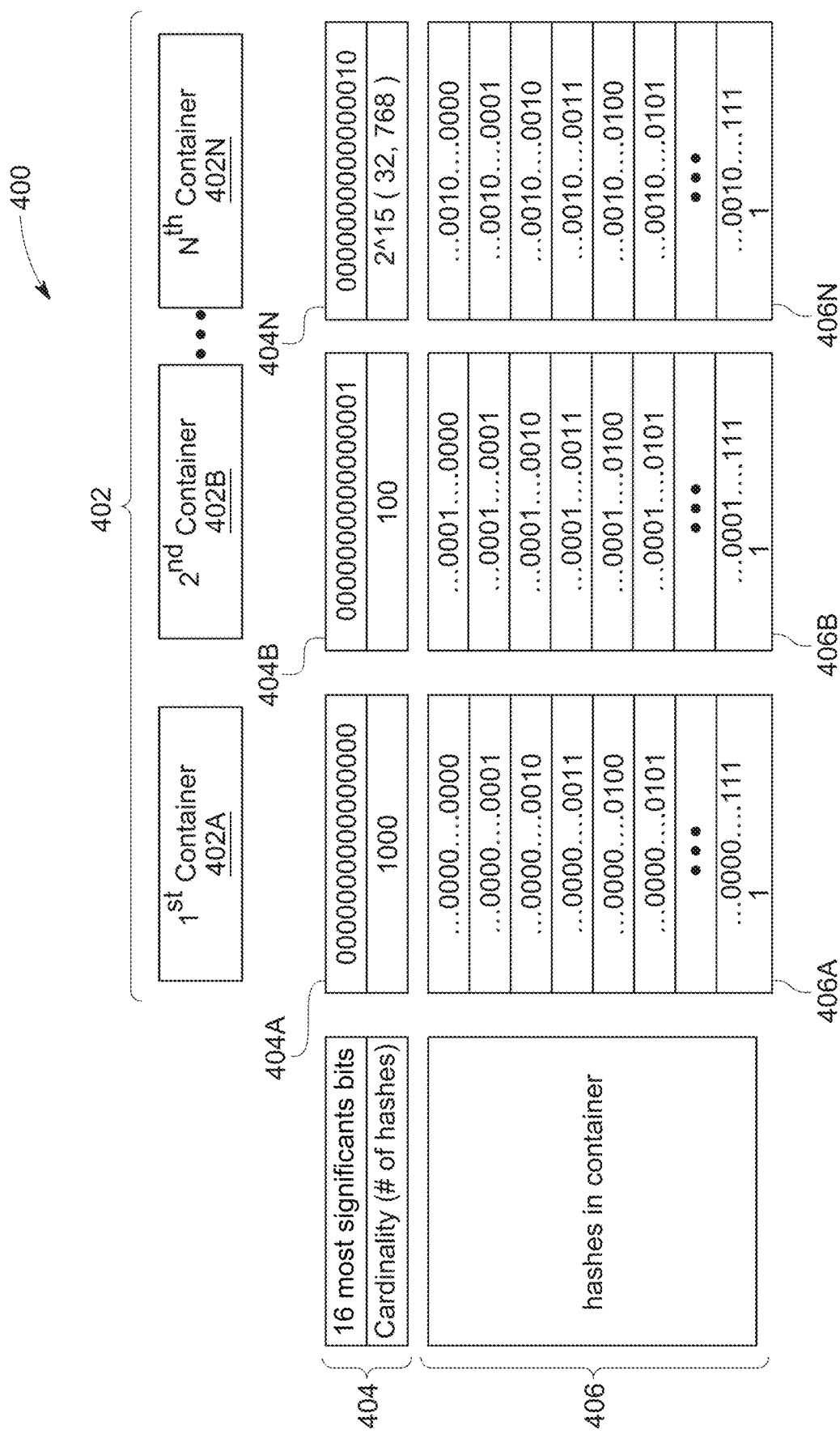
FIG. 4 depicts a second type of a search data structure for an index.

FIG. 4 depicts a second type of a search data structure 400 for an index. The features of the second type of search data structure 400 for the index of FIG. 4 may apply to FIGS. 1, 2, 5A and 5B. In some cases, the second type of search data structure 400 may be a bitmap data structure. In some cases, the bitmap data structure may be a roaring bitmap or a roaring plus run bitmap. In some cases, the bitmap data structure includes encoded spacetime hashes with binary length 32 bit or 64 bit. In some cases, the bitmap data structure includes encoded spacetime hashes with a set binary bit length, such as binary length 32 bit, 64 bit, 128 bit, and the like.

In the case of bitmap data structure being a bitmap, the bitmap may be a group of bit vectors corresponding to spacetime hashes. In the case of bitmap data structure being a roaring bitmap, the roaring bitmap may group bit vectors into separate groups (e.g., based on most significant bits). Generally, the server 120 may obtain the spatial-time data (e.g., latitude/longitude/altitude/time), encode the spatial-time data into a spacetime hash (e.g., an ASCII string), encode the spacetime hash into a hexadecimal string, and encode the hexadecimal string into a bit integer. The server 120 may then store the bit integer (corresponding to a spacetime hash, if decoded back) into the bitmap/roaring bitmap.

Like with the trie data structure, the server 120 may generate/maintain multiple different versions of bitmaps/roaring bitmaps. For instance, a first version may be a global version (e.g., to include all observations/records), a second version may be focused on a certain time window, a third version may be focused on observations/records for a specific region, and the like. In this manner, the server 120 may perform searches using specialized bitmap data structures on more limited datasets, to reduce computation resource and/or time. For instance, the search parameters may indicate the search should only cover North America, so the server 120 may select a North America bitmap data structure.

Generally, roaring bitmaps are a compressed bitmap data structure (e.g., optimized for 64-bit CPUs) that enable set operations on 32 or 64 bit integers, with performance improvements of up to three orders of magnitude. As a non-limiting example, the bitmap data structure 400 includes a plurality of containers 402, including a first container 402A, a second container 402B, . . . , and an Nth container 402N. Each container may store spacetime hashes 406 in (a compressed or not) a binary notation, as first spacetime bit integers 406A, second spacetime bit integers 406B . . . and Nth spacetime bit integers 406N. Each container of container 402 may also have metadata 404 (e.g., in a table or other data structure) associated with it, such as first container metadata 404A, second container metadata 404B, . . . and Nth container metadata 404N. The metadata 404 may indicate a partition associated with a container and a cardinality of the container. The partition associated with a container may be a set of most significant bits that are shared with all spacetime hashes stored in the container. The cardinality of the container may indicate a number of spacetime hashes stored in the container. The bitmap data structure may store the spacetime hashes (e.g., in binary format) in different manners based on whether the number of spacetime hashes is considered sparse or dense (e.g., based on a threshold number). A sparse number of spacetime hashes may be stored in a list/array format), while a dense number of spacetime hashes may be stored in a bitmap format. In the case depicted in FIG. 4, the first and second containers 402A and 402B may store the spacetime hashes in a list/array format, while the Nth container 402N may store the spacetime hashes in a bitmap.

To generate the bitmap data structure, the server 120 may obtain a plurality of spacetime hashes, encode the spacetime hashes into bit integers, determine shared most significant bits for sets of the bit integers, assign bit integers to different containers based on their respective most significant bits, and store the bit integer in the assigned containers. In some cases, the server 120 may also determine whether a container is sparse or dense, and store the bit integers based on whether the container is sparse or dense.

To update the bitmap data structure, the server 120 may add new bit integers for inbound observations/records to the bitmap data structure. For instance, the server 120 may determine bit integers for the inbound observations/records, and determine a container for the bit integer based on their respective most significant bits. In some cases, the server 120 may remove bit integers from the bitmap data structure (e.g., if the data is stale). In some cases, the server 120 may automatically (e.g., in response to the update or at set intervals) determine if the container has switched from being sparse to dense (or dense to sparse) and, if so, change a manner in which the bit integers are stored in the container.

To search the bitmap, the server 120 may encode a spacetime hash of the entity of interest into binary notation, and determine whether the encoded spacetime hash of the entity of interest is included in the bitmap. For instance, the server 120 may determine whether the encoded spacetime hash of the entity of interest is a subset of the bitmap.

In response to determining the encoded spacetime hash (e.g., a bit integer) is a subset of the bitmap, the server 120 may determine a key value for the matching encoded spacetime hash in the bitmap that matches the encoded spacetime hash of the entity of interest. For instance, the bitmap search returns a Boolean value of true if the bit integer is a subset of the bitmap, or a Boolean value of false if the bit integer is not a subset of the bitmap. If the Boolean value is true, the server 120 may then search the datastore(s) 125 for a spacetime hash corresponding to the bit integer. In this manner, a search of the bitmap (that returns true Boolean value) may indicate the search of the datastore(s) 125 will find a match and is faster than just running the search of the datastore(s) for a match (without knowing a match will be found).

In some cases, the bitmap data structure may provide fixed precision searches. To provide fixed precision searches with complete results, the bitmap data structure may have the following conditions: (1) the precision of the spacetime hashes (e.g., their string length) within the bitmap all match each other, and (2) the precision of the spacetime hash (e.g., its string length) used to query the bitmap must match the precision of the spacetime hashes stored in the bitmap. To provide fixed precision searches with partial results, the bitmap data structure may have the following conditions: (1) the precision of the spacetime hashes (e.g., their string length) within the bitmap do not all match each other, and (2) the precision of the spacetime hash (e.g., its string length) used to query the bitmap must match the precision of at least a subset the spacetime hashes stored in the bitmap.

Thus, the server 120 may automatically select (even if a search parameter is included or not) a trie or a bitmap based on the precision level of the query and the precision level of the spacetime hashes stored in the bitmap. If the precision level (e.g., the string length) does not match, the server 120 may select the trie. Optionally, the server 120 may also search the bitmap for a partial result if at least a subset of the spacetime hashes match the prevision level of the query.

In some cases, roaring bitmaps may implement a number of operations to search the bitmaps. The operations may include one or combinations of: a subset operation, an intersection operation, and a Jaccard Distance operation.

A subset operation may determine whether a set of spacetime hashes (e.g., one or a plurality of spacetime hashes of a query or inbound records) exist in the roaring bitmap. The subset operation returns a Boolean value of true or false. An intersection operation may return a set of (encoded) spacetime hashes that match between the search query (e.g., for an entity of interest or inbound records) and the roaring bitmap.

A Jaccard distance operation may determine a similarity metric of two sets of (encoded) spacetime hashes in the roaring bitmap. For instance, if two devices (e.g., with different device IDs) have spacetime hashes stored as bit integers in the roaring bitmap, the server 120 may execute the Jaccard distance operation and obtain a similarity metric between two devices (based on the observations encoded in the roaring bitmap) and quantify the relationship between these entities. For instance, to quantify the relationship, the server 120 may determine the two devices are the same or co-travelers if the two sets have a similarity metric above a threshold value, or determine the two devices are not the same or co-travelers if the similarity metric is below a threshold value.

1.C. Generate/Update an Index

FIG. 5A depicts a block diagram 500A schematically showing operations O502 through O514 to generate/update an index. The features of the block diagram 500A schematically showing operations O502 through O514 to generate/update the index of FIG. 5A may apply to FIGS. 1, 2, 3, 4, and 5B. The operations O502 through O514 may be performed by various devices of the environment 100.

In operation O502, the sources 110 may transmit inbound records to the server 120. For instance, the sources 110 may transmit inbound records in real-time or in batches (e.g., at set intervals, or in response to trigger conditions, such as data being gathered from observation devices). The server 120 may receive the inbound records from the sources 110.

In operation O504, the index 130 may transmit a current search data structure. The index 130 may transmit the current search data structure in response to a request from the server 120, in response to inbound records, or in response to receiving an updated search data structure (e.g., server 120 is a cloud system with multiple instances of the query application).

In operation O506, the server 120 may process the inbound records, correlate the inbound records with existing records based on current search data structure, and determine new or fused records. To process the inbound records, the server 120 may apply extract, transform, and load processes to the inbound records. The extract, transform, and load processes may include: extracting key fields, generating spacetime hashes, applying Kalman filtering, and the like. To correlate inbound records with existing records, the server 120 may perform a multi-tiered search process that includes at least first searching the current search data structure for any existing records that overlap in 4-d spacetime, as discussed herein. The multi-tiered search process may then analyze device IDs and/or metadata to confirm co-traveler or duplicate observations, and the like, if a matching key value term is found in the search of the search data structure. Based on the output of the multi-tiered search process, the server 120 may determine new or fused records.

In operation O508, the server 120 may update the datastore(s) 125 with the new or fused records. In operation O510, the server 120 may update the search data structure or generate a new search data structure, as discussed herein. In operation O512 and O514, the server 120 may pull records (e.g., as needed) from the datastore 125 and update the index 130 with the updated/newly generated search data structure, as discussed herein.

1.D. Search an Index

FIG. 5B depicts a block diagram 500B schematically showing operations O522 through O534 to search an index. The features of the block diagram 500B schematically showing operations O522 through O534 to search the index of FIG. 5B may apply to FIGS. 1, 2, 3, 4, and 5A. The operations O522 through O534 may be performed by various devices of the environment 100.

In operation O522, the user device 105 may transmit a query message to the server 120. For instance, the user device 105 may generate the query message based on user inputs (via a graphical user interface) and/or generate the query message algorithmically (based on operations software triggers, e.g., in response to sensing an entity) to (1) request a status of an entity or (2) request tracking of an entity.

In operation O524, the index 130 may transmit a current search data structure. The index 130 may transmit the current search data structure in response to a request from the server 120, in response to the query message, or in response to receiving an updated search data structure (e.g., server 120 is a cloud system with multiple instances of the query application).

In operation O526, the server 120 may process the query message (e.g., extract search parameters and the like), and search the current search data structure for, if any, matching key values, as discussed herein.

In some cases, the server 120 may also (1) search, using inbound device IDs, for matching device IDs in an ID datastore to correlate inbound observations/records to existing observation/records and/or (2) search, using inbound metadata sets, for matching metadata sets in a metadata datastore to correlate inbound observations/records to existing observations/records. In these cases, the additional searches may be performed in parallel or after the search of the current search data structure. In some cases (e.g., geospatial and time data is not a part of an inbound observation/record), the server 120 may by-pass the search of the current search data structure (e.g., because the server 120 cannot determine a spacetime hash for the inbound record) but still correlate inbound observations/records. In some cases, the additional searches may supplement the search of the current search data structure. In these cases, device ID search/metadata search may operate to increase a confidence score for deduplication or co-traveler determination.

In operation O528, the server 120 may retrieve relevant data based on the at least one matching key. For instance, the relevant data may be metrics, metadata, and/or observation data of records corresponding to the matching key values.

In operation O530, the server 120 may update records of datastore(s) 125. For instance, the server 120 may update records of the datastore(s) 125 if the query message included additional contextual data regarding observations, device IDs, etc.

In operation O532, the server 120 may generate a query response. For instance, the server 120 may package the relevant data obtained in operation O528 in a defined format. In operation O534, the server 120 may transmit the query response to the user device 105.

2. Event Tracking

FIGS. 6-10 depict features of event tracking. Features of FIGS. 6-10 may apply to any of FIGS. 1, 2, 3, 4, 5A and 5B.

Event tracking systems are designed to monitor, identify, and categorize real-world occurrences based on various types of data. These systems are often employed in a wide range of fields, including security, logistics, and social media analytics, among others. The data used for event tracking can come from a multitude of sources and can be presented in various formats and modes, including text, image, audio, video, and sensor data.

The process of event tracking typically involves the extraction of meaningful information from raw data. This can include identifying the geospatial and temporal aspects of an event, as well as categorizing the event based on its subject matter. Geospatial data, such as latitude, longitude, and altitude, provide information about the location of an event. Temporal data, such as timestamps, provide information about when an event occurred. Categorizing an event involves identifying the subject or topic of the event, which can range from broad categories like "weather" or "politics" to more specific topics like "hurricane" or "election."

To facilitate the process of event tracking, various computational techniques are often employed. For instance, Natural Language Processing (NLP) can be used to extract meaningful information from text-based data. Object detection and facial recognition techniques can be applied to image and video data to identify specific objects or individuals. Metadata extraction can be used to obtain additional information about an event, such as when and where a photo or video was taken.

Once the meaningful information has been extracted from the raw data, it is typically encoded or hashed to create a more manageable and searchable representation of the event. This can involve generating a geohash for the geospatial data, a timehash for the temporal data, and a topic hash for the event category. These hashes can then be combined to create a compound hash that uniquely represents the event.

The compound hashes are typically stored in a database or other data structure, which can be queried to retrieve information about specific events. The structure of this database or data structure can vary widely, but common examples include trie structures and bitmap structures. These structures are designed to facilitate efficient querying and retrieval of event information.

In addition to correlating event descriptions with each other, it may also be of interest to correlate events with other entities of interest. This could include specific locations, such as sensitive government facilities, or specific sensors, such as a security camera that may have captured footage of an event. This correlation can be implemented using various techniques, such as a "tripwire" that identifies events that occur within a specific radius of an entity of interest.

Despite the complexity and diversity of event tracking systems, they all share a common goal: to identify and categorize real-world events based on various types of data. This allows for a more comprehensive understanding of the world around us, and can provide valuable insights in a wide range of fields.

The present disclosure provides a system for event tracking that is capable of identifying and resolving events across multiple data modes with varying geospatial, temporal, and categorical precision. The system may obtain event information for a plurality of events, where the event information includes time-and-geolocation data indicating a setting of an event, and topic data indicating a subject of the event. The system may generate a plurality of compound hashes based on the plurality of events, where each compound hash includes a spacetime hash and a topic hash for a specific event.

The system may form a search data structure based on the plurality of compound hashes. The search data structure may be configured to group a plurality of spacetime hashes into subsets and structure a plurality of topic hashes in vectors or groups of subsets. The search data structure may also be configured to point to a plurality of keys for a plurality of records associated with the event information based on the plurality of compound hashes.

The system may execute a query of the search data structure based on a query compound hash and/or query parameters, and in response to the query returning at least one matching keys, the system may transmit event content based on the at least one matching keys.

The system may also include a narrative generation model configured to generate a semantic description of relevant events as the event content. In some cases, the system may process the event content using a preferential learning model configured to generate and rank scores for discrete event tokens to predict how relevant an event is to a user.

The system's ability to correlate events across multiple data modes with varying geospatial, temporal, and categorical precision provides a comprehensive and efficient approach to event tracking. The use of a search data structure based on compound hashes allows for efficient querying and retrieval of event information, thereby enhancing the computational benefits of the system.

2.A. Event Tracking Operations

Figure 6:
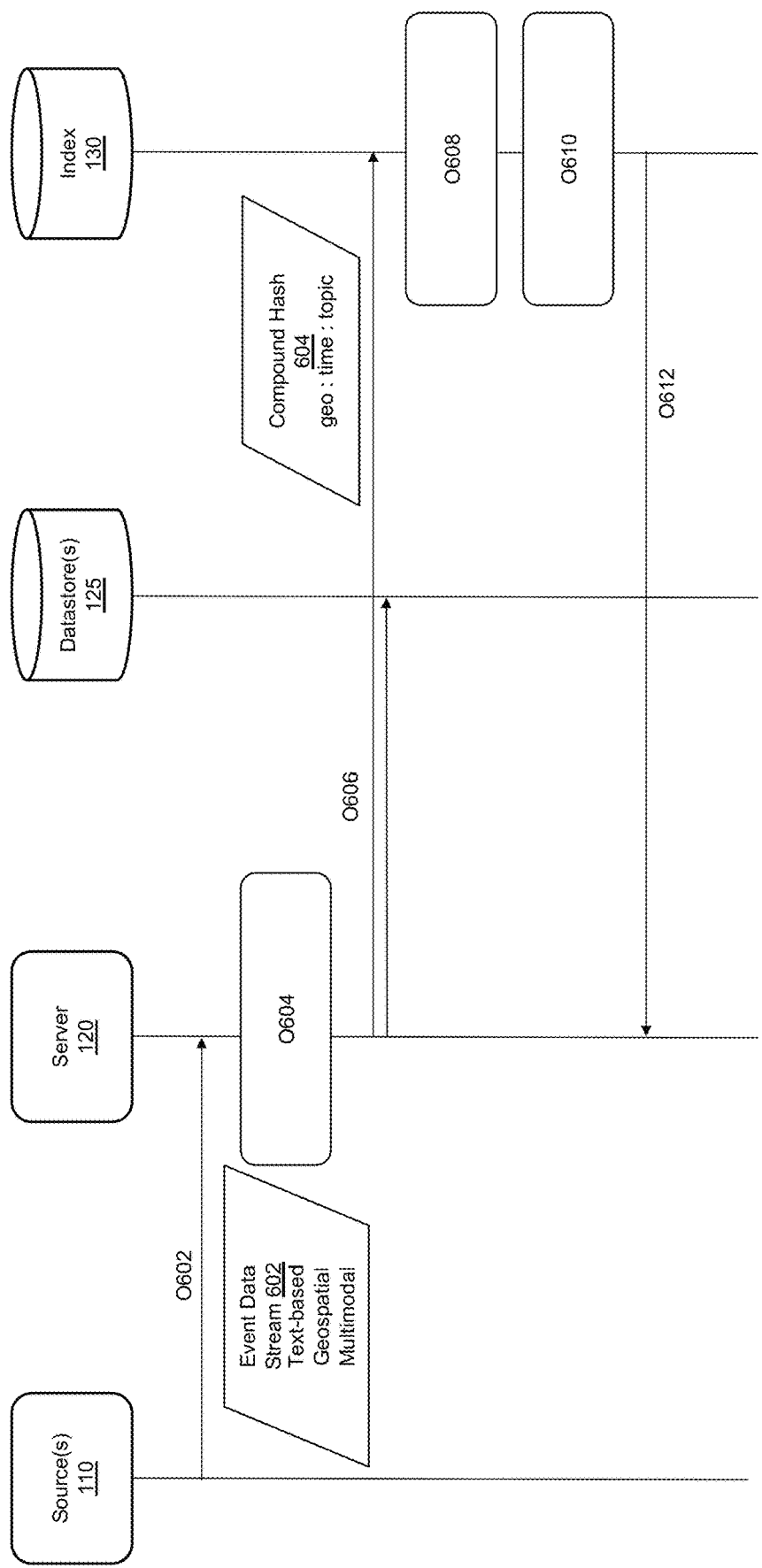
FIG. 6 depicts a block diagram schematically showing operations for tracking events.

FIG. 6 depicts a block diagram 600 schematically showing operations O602 through O610 to track an event by searching an index 130. The features of the block diagram 600 may apply to FIGS. 1, 2, 3, 4, 5A, and 5B. The operations O602 through O610 may be performed by various devices of the environment 100.

As the volume of information being distributed amongst online platforms, online news, and overall size of the internet grows, cross-indexing digital events, cross-correlating to real-world locations and times and events, and, disambiguating similar or not events, has become increasingly difficult. Considering the extent of such publicly available information ("PAI"), it may be advantageous to have a system that can autonomously aggregate/group data into related events and determine events to present to a user of the system. However, different sources tend to generate PAI describing events in varying formats and modes. For example, the PAI may vary in terms of geospatial, temporal, and categorical precision. Further, the PAI may vary in mode, such as text, image, video, audio, and the like. As described herein, it may be desirable to have a system that can obtain, process, and index the PAI to account for the variability mentioned above, leading to more efficient determinations as to what events are relevant and should be presented.

In operation O602, event data stream 602 may be obtain from a multitude of sources 110. Examples of such sources 110 are provided in FIG. 1 as described above and may further include online platforms (e.g., with PAI). In some cases, the event data stream 602 may include PAI. In some cases, the event data stream 602 may include observation data (e.g., sensor data, reports, and the like), as discussed above. In some cases, the event data stream 602 may include records of either PAI and/or observation data. In some cases, the PAI may be obtained via APIs (e.g., if a platform supports such PAI sharing), while in others the PAI may be retrieved using a web crawler system or the like. It should be noted that while online platforms that generate descriptions of events are used as examples herein, the PAI may be generated by third party sources 110.

At operation O604, the server 120 may ingest the event data stream 602 and process the event data stream 602 to extract event data for an event. In some cases, the server 120 may ingest the event data stream 602 to extract a plurality of event data for a plurality of events. Because the event data stream 602 may come from various sources 110 and often represent different aspects of information, the event data stream 602 may be multi-modal, single modal, mis-aligned in time, or presented in an unordered state. In some cases, the event data stream 602 may include data in various formats, types, etc. For example, data sent from a first source 110 may be text-based (e.g., contents of a text file, string messages, etc.), image-based, video-based, audio-based, and/or geospatial (e.g., also referred to as time-and-geolocation data herein). As will be described herein, the event data stream 602 may describe one or more real-world events. For example, a text file may be generated from a social media post made by a user that describes a bombing that occurred at a particular destination. In such a case, the event data stream 602 may include event data that describes features of the event (e.g., actors, actions, and the like), time, location, and the like. The server 120 may be configured to extract the event data and determine time-and-geolocation data (e.g., when and where did the user make this post or where and when was the event the post is about) and topic data (e.g., describing the subject/contents of the event).

In some cases, if the event data stream 602 has image or video formats, one or more of the following techniques may be applied at operation O604 to generate topic data and time-and-geolocation data described herein: object detection, facial recognition, and/or metadata extraction. Object detection may be performed by one or more computer vision algorithms and/or deep learning models to enable the system to identify/locate objects within digital images and/or video. Facial recognition may be performed by machine learning models to identity of an individual depicted in the digital images or video. Metadata extraction may be performed by deterministic algorithms or machine learning models to ascertain time-and-geolocation data from embedded information such as timestamps, coordinate projection information, spatial resolution, etc.

In some cases, if the event data stream 602 includes audio formats, a transcription technique may be implemented to convert the speech or noises of the audio into a text format. This technique may be performed with humans-in-the-loop, and/or it can be automated via speech recognition software.

In some cases, if the event data stream 602 includes a text formats, text analytics and natural language processing (NLP) techniques may be implemented to generate topic data and time-and-geolocation data. For example, entity extraction and resolution may transform unstructured text, semi-structured text, and/or structured text into actionable, useful data. In some cases, the actionable, useful data may include key information or "entities" contained within the text, which may be classified into categories including names of people, locations, time, organizations, and the like. The output may be text segments tagged with respective entity types. Tagged entities may be processed via deduplication to remove any duplicate data (e.g., two entities separately tagged refer to the same thing). In some cases, NLP techniques such as part-of-speech (POS tagging may be implemented to derive relationships between the different entities.

After a portion of event data stream 602 has been processed to generate time-and-geolocation data and topic data for a plurality of events, the server 120 may generate a plurality of compound hashes. The server 120 may generate the plurality of compounds hashes based on the time-and-geolocation data and topic data for the plurality of events. In some cases, separate hashes may be generated for the time-and-geolocation data ("spacetime hash") and the topic data ("topic hash"). In some cases, a compound hash (e.g., a single, unified hash) may be generated by concatenating the spacetime hash with the topic hash. An example of the format of this hash may be {location hash value-time hash value-topic hash value}.

For time-and-geolocation data, the server 120 may process the time-and-geolocation data to generate spacetime hashes, as described herein with respect to FIGS. 1-5B. In some cases, encoding the time-and-geolocation data may include generating a time hash and a geohash. In some cases, encoding the time-and-geolocation data may include generating a time hash, a geohash, and an altitude hash (e.g., if altitude data is present). In some cases, the time hash, the geohash, and (if present) the altitude hash may be combined into a spacetime hash as discussed herein. In some cases, the time hash, the geohash, and the altitude hash may be kept separate (e.g., stored together, but not interleaved) or may be concatenated, as may be more useful or efficient for correlation in tandem to correlation for topic hashes.

For the topic hash, the server 120 may process the topic data and/or raw data of event data (e.g., text snippets, images, audio, images, video, etc.) and generate the topic hash. In some cases, the server 120 may process the topic data using one or more text categorization/classification techniques trained to assign labels that indicate a subject of the event ("event type"). In some cases, the server 120 may map the topic data to entries in a defined ontology. See FIG. 8. In some cases, the server 120 may embed the raw data (or summaries of raw data, e.g., using an LLM) into a vector in a vector space. See FIG. 7. In some cases, the server 120 may perform each type of process and determine whether the different processes form a consensus.

For example, the topic data may be a standardized file with structured text split into tokens (words, phrases, etc.). The standardized file may be fed into a classification model (e.g., an LLM) trained to assign a label based on the tokens. An example of a label may be "a violent attack." After generating the labels, the server 120 may generate the topic hash by feeding a respective label into a hash function configured to convert the label (e.g., or words of the label) into a hash value.

At operation O606, the server 120 may store, for each event, event data with its compound hash as a record in the datastore 125. The server 120 may also transmit the compound hashes to the index 130, so that the index 130 may generate a search data structure, or update a search data structure based on existing compound hashes and the new compound hashes. The index 130 may receive the new hashes and, if applicable, retrieve an existing search data structure.

At operation 608, the index 130 may generate a new search data structure or update an existing search data structure based on the new compound hashes. In some cases, the search data structure may be the same as, similar to, or different than the search data structure described in FIG. 3. For example, the search data structure may be a trie structure whereby compound hashes of existing records are indexed such that future key matches will return a pointer to where the record exists on the datastore. In some cases, the search data structure may be a bitmap (e.g., roaring bitmap or roaring plus run bitmap) where the compound hash is converted to a bit integer and compared to integer values contained within the bitmaps. In these cases, hashing the topic data may allow the index 130 to perform an event correlation operation to quickly identify matches with records already existing at the search data structure.

In some case, the server 120 may include a first data structure for the spacetime hashes and a second data structure for the topic hashes. The first data structure may perform as discuss herein with respect to the FIGS. 1-5B. The second data structure may group subsets of topic hashes based on different strategies, as discussed herein with respect to FIG. 8.

In some cases, instead of using hashes on the labels of the topic data, one or more vectorization techniques (see FIG. 7) may be implemented to identify matches (a) between existing event data of existing records and incoming event data of incoming records or (b) between existing event data of existing records, before or after a spacetime correlation. When vectorization is used to topic hashes, the search data structure may group spacetime hashes, as discussed above, and the vectors for topic hashes may be compared to each other for similarity.

In some cases, the results of querying the search data structure (e.g., to process incoming events) may be used by the system to update the search data structure up-to-date. For example, if a query of the search data structure returns "no match," the server 120 may be triggered to update the search data structure. In the case that query returns a match, the server 120 may determine a matching event is already indexed and not update the search data structure or may fuse the respective data together. In these cases, the server 120 may update meta data related to the matching event, such number of sources, and the like.

At operation O610, after the search data structure has been generated or updated, the index 130 may receive a query. For instance, the server 120 may transmit a query to the index 130 to fuse new incoming event data stream 602 (or trigger an update) or based on a user request (e.g., like in operations O522 through O526). The index 130 may receive the query and search for matching entries in the search data structure. For instance, a query may include a query compound hash or query parameters. A query compound hash may include a query spacetime hash and a query topic hash. Query parameters may define specific or ranges of spacetime hashes and/or specific or ranges of topic hashes that are of interest. As an example, a set off query parameters may request the index 130 to search for "topics: protests; time: year 2024; location: United States." The index 130 may search the search data structure using various techniques using query parameters (e.g., filtering records, sampling records, grouping records, and the like based on the query parameters) to determine a result set of key value(s).

The index 130 may determine matching entries (if any) in the search data structure and return matching key value(s) (if any matching entries). The key value(s) may point to record(s) for an event or a set of events that match the compound query or query parameters. The index 130 may determine matching entries in various methods based on the type of search data structure being used (e.g., only one search data structure for compound hashes; a first search data structure for spacetime hashes and a second search data structure for topic hashes; or the first search data structure and vectors for topic hashes).

At operation O612, in response to obtaining the results for a query compound hash or query parameters, the index 130 may transmit query results to the server 120. The server 120 may (if for new incoming event data stream 602) determine to store the event as a new event (e.g., for an update), store the event as an existing event, and/or fuse data with the existing event. The server 120 (if for query parameters) may transmit a response to a user including the query result. The query result may include the key values, records associated with the key values, summaries associated with the records associated with the key values, and/or metrics associated with the key values (collectively, "event content").

In this manner, using a search data structure for events instead of performing table comparisons/searches or word searching may be computationally faster and better suited to handling large datasets. Additionally, upon the search data structure returning a match, the system may query and retrieve the event content (e.g., raw data from the record(s), summaries, related data, etc.).

2.B. Event Tracking Using Embedded Vectorization

Figure 7:
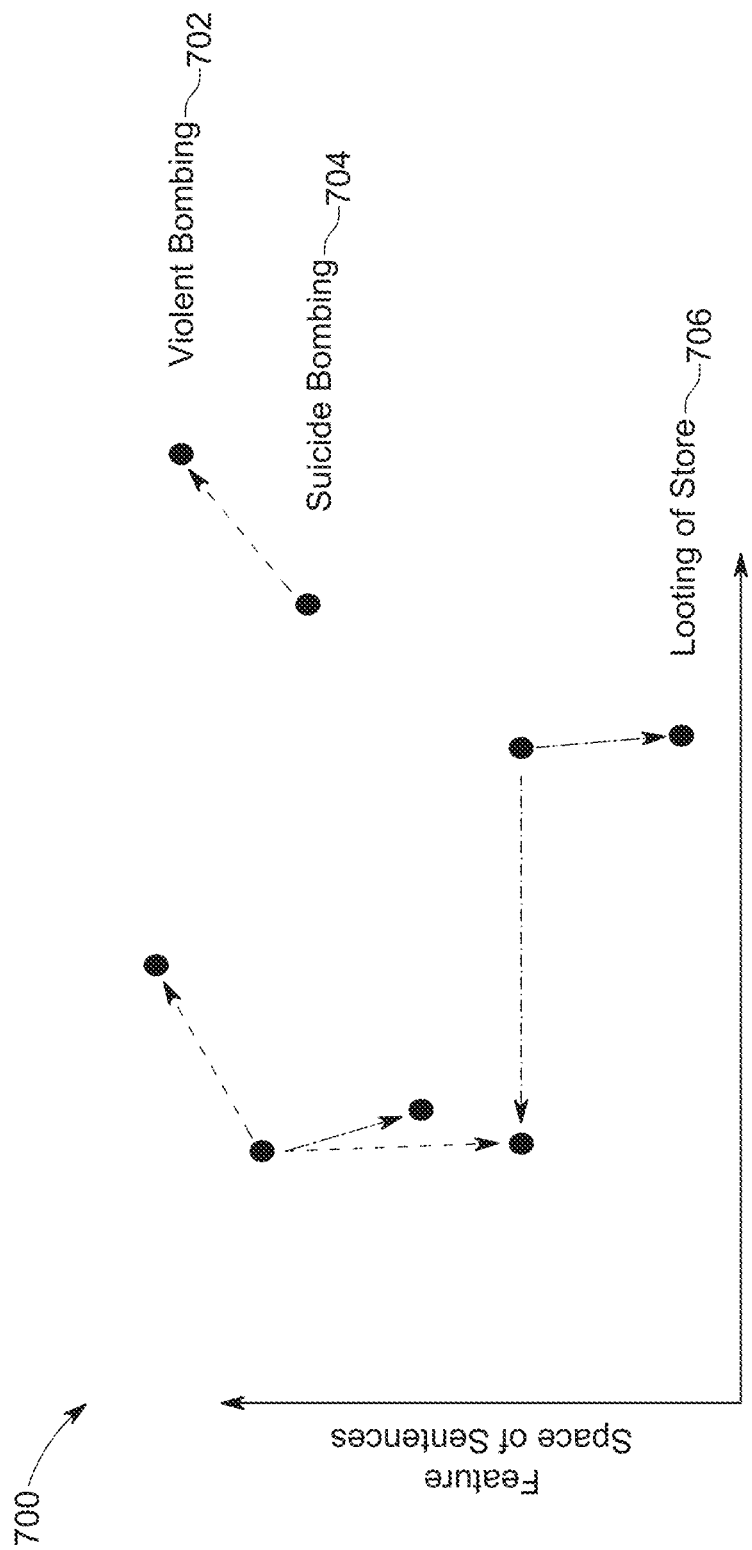
FIG. 7 depicts a diagram of embedded vectorizations for tracking events based, at least in part, on geospatial correlation.

FIG. 7 depicts an exemplary diagram 700 of embedded vectorization for tracking events based, at least in part, on geospatial correlation. As mentioned in FIG. 6, labels may be generated and tagged to topic data contained within an incoming data stream. None, some, or all these labels may be stored as fields for a given record (which may additionally include respective fields for geohash, timehash, and topic hash) at the datastore 125. As a non-limiting example, Table 2 depicts exemplary records of event records stored at the datastore 125, where each record contains respective fields for a generated geohash, timehash, and topic hash.

TABLE 2

Example Records with Topic Field

| Identifier | Geohash | Timehash | Topic Hash | Topics (labels) | Metrics | Raw Data |
|---|---|---|---|---|---|---|
| 000001 | tw45g | b1aae | B3b | Airstrike | Source IDs | [1st array] |
| ... | ... | ... | ... | ... | ... | ... |
| 100001 | tw45g | b1aae | B3d | Suicide bombing | N sources | [Nth array] |

In some cases, the records may include at least one of the additional fields in Table 1, such as at least some of the metadata fields (e.g., "Metadata #1), pointer fields (e.g., to raw data in source formats), and the like may be added as a field to records.

In order to perform event correlation between incoming data and records existing at the datastore 125, determining matching records based on Table 2 may be computationally intensive (e.g., in time and compute). Instead, the server 120 may determine similarity of topic hashes of such records.

In some cases, the server 120 may determine similarity of topic hashes based on similarity of vectors for the events. An example of such search data structure may be a vector embedding model, which maps text (e.g., words, phrases, sentences, paragraphs, text segments, images, videos, or audio, or summaries of the foregoing) to vectors in a feature space (e.g., a low-dimensional space to represent high-dimensional multi-modal data). FIG. 7 depicts a representative space for visual representation of vectors (e.g., event descriptions contained within the topic data or raw data converted to the feature space).

In some cases, before comparing the vectors for similarity or clustering, a filtering technique may be executed to only compare vectors with matching spacetime hashes. For example, a filtering query that includes a filter spacetime hash as a query parameter may be generated and sent to the index 130. The query spacetime hash may be considered as criteria/condition whereby only records with a matching spacetime hash may be retrieved for comparison. In some cases, a prefix match (described further in FIG. 8) may be considered acceptable and included in the filtered set of vectors. Filtering may result in comparing topic data of only the events that happened within the same region and time window, which may improve efficiency by reducing the number of computations performed.

The spatial similarity of the vectors may be evaluated to determine with events are correlated. Using the example visual representation shown in FIG. 7, a first label 702 may be the phrase "violent bombing" while a second label 704 may be the phrase "suicide bombing." Additionally, a third label 706 may be the phrase "looting of store." As shown, each of the foregoing may be fed as input to a vector embedding model and outputted as respective vectors represented in the feature space. Evaluating the spatial similarities shows that that the first label 702 and second label 704 are more closely related to one another than the third label 706. To determine a match between a first vector generated from incoming data and a stored vector linked to an existing record, a similarity calculation may be performed. In some cases, a match may only be detected when the result of such calculation exceeds a pre-defined threshold. An example of a similarity calculation may be cosine similarity. A cosine similarity operation may be performed on the vectors and if the calculated score exceeds a pre-define threshold, then a match may be detected. In some cases, the calculated values may be grouped into clusters of pre-defined categories of events, where if any future calculated value falls within a given category, a match indicating that the topic data relates to the event associated with the category may be detected.

In some cases, other similarity calculations/methods may be used either in combination or in the alternative. Examples of such methods include Euclidean Distance, Jaccard Similarity, Levenshtein Distance (which may be particularly useful in cases where the source of the information encourages casual dialogue where typos and grammatical errors are more common), cosine distance, angular distance, and/or other techniques that can measure distances between vector embeddings.

Additionally, while a vector embedding model is used as an example herein, other NLP approaches may be used to compare the text entities of the event descriptions. In some cases, these alternative approaches may be useful when the range of topics that the input data pertains to is limited in scope. Examples of such approaches include a rule-based system, one-hot encoding, symbolic AI model, a NN without pre-trained word embedding, and/or other techniques/tools for identifying semantic relationships within a body of text.

2.C. Event Tracking using Event Trie

Figure 8:
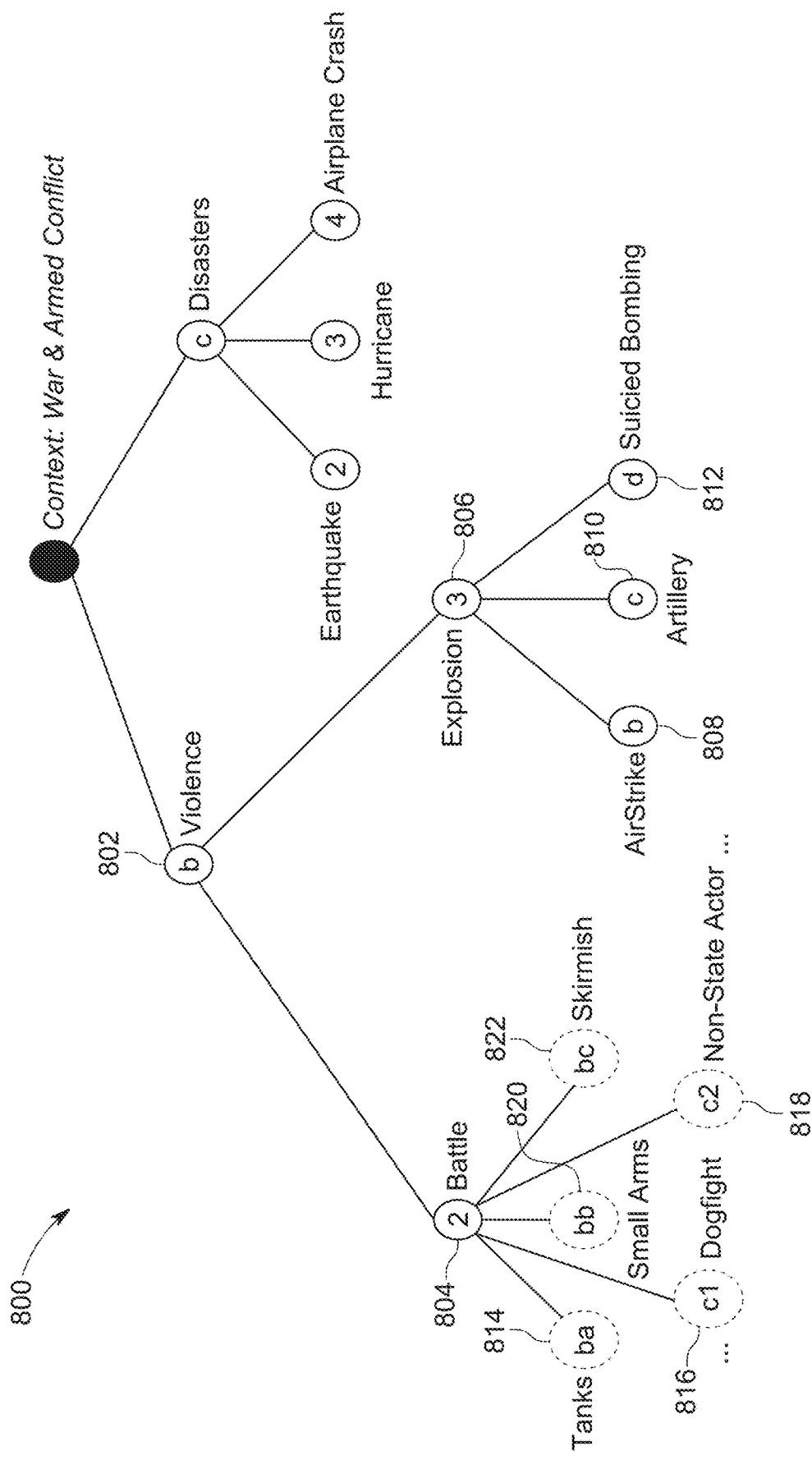
FIG. 8 depicts a diagram of a trie search data structure for tracking events based, at least in part, on geospatial correlation.

FIG. 8 depicts an exemplary diagram 800 of a trie search data structure used to track events based on geospatial correlation. As mentioned herein, incoming data may be converted into a compound hash consisting of a spacetime hash and an encoded topic hash. As shown in FIG. 7, one example of utilizing a search data structure to determine similar events (e.g., events with similar event descriptions) is by vectorization of the topic data and/or raw data. Another example of a search data structure that can be used to identify similar events is a trie. An example of such trie is the diagram 800 of FIG. 8. The trie structure of event hashes may perform operations similar to those described in FIG. 3. For example, a query may be obtained/generated by the system and used to search the trie search data structure in order to determine (and request) any existing records that match query event information. In some cases, the query may include a query compound hash (generated from incoming data as described in FIG. 6) and one or more query parameters (e.g., to surface information). In order to execute the query, the query spacetime hash of the query compound hash may be compared against spacetime hashes recorded within the trie structure in a manner similar to that which was described in FIG. 3. In some cases, prefix matching the trie (where a given prefix of the query spacetime hash is used to traverse the key until a node corresponding to a last character of the prefix is reach; and from there a depth-first search retrieves all keys that share that prefix) may enable hashes with variable precision to return as matching. For example, a topic hash contained within a query topic hash may have the string "dqcjq" while a record of the trie structure may be associated with the key "dqcjqcp." In such a case, when searching the trie structure with the example query topic hash, an event match with a key value may be returned despite the difference in the respective hash precisions.

In some cases, hashing the topic label may use a pre-defined ontology/mapping that orders topic labels or topic data into a hierarchy of nested event categories/types. The hierarchy may be referenced when determining the parent and child nodes of the trie structure. For example, the mapping of event categories may provide parent and/or child relationships with specific other event category(s), where a parent event is associated with a lower level of precision than a child event. As a non-limiting example, Table 3 depicts an exemplary ontology depicting the relationships between the parent and child event categories.

TABLE 3

Example Ontology

| General | Event Type | Sub-Event Type |
|---|---|---|
| Violent events | Battles | Armed clash |
| | | Government regains territory |
| | | Non-state actor overtakes territory |
| | | Chemical weapon |
| | | Air/drone strike |
| | Explosions/Remote violence | Suicide bomb |
| | | Shelling/artillery/missile attack |
| | | Remote explosive/landmine/SED |
| | | Grenade |
| | Violence against civilians | Sexual violence |
| | | Attack |
| | | Abduction/forced disappearance |
| Demonstrations | Protests | Peaceful protest |
| | | Protest with intervention |
| | | Excessive force against protesters |
| | Riots | Violent demonstration |
| | | Mob violence |
| Non-violent actions | Strategic developments | Agreement |
| | | Arrests |
| | | Change to group/activity |
| | | Disrupted weapons use |
| | | Headquarters or base established |
| | | Looting/property destruction |
| | | Non-violent transfer of territory |
| | | Other |

The parent and child nodes of the trie search data structure may be hashed according to the event categories of the mapping/ontology, where a parent node is associated with a lower level of precision than a child node.

For example, as shown in FIG. 8, a first node 802 (violence, labeled b) of a root node may have at least one child node, such as second node 804 ("battle", labeled 2, corresponding to the hash b2) and a third node 806 ("explosion", labeled 3, corresponding to b3). In some cases, the nodes may have strict lower levels of children nodes, such as in the case of the third node 806, which has airstrike node 808 (hash: b3b), artillery node 810 (hash: b3c), and suicide bombing (hash: b3c). In some cases, the nodes may have a loose lower level of children nodes, such as in the case of the second node 804, which has a plurality of nodes 814-822. Each of nodes 814-822 may be tagged to an event; that is, an event may be assigned zero, one or more of nodes 814-822. The categories (and sub-categories) may be pre-defined for a specific context, e.g., "War," or may be manually set by a user of the system.

A query of the trie structure shown in FIG. 8 with the query topic hash may return the key b2c associated with label "artillery" 804 since both strings share the same parent node.

Thus, the topic hash trie may be configured in different arrangements. In some cases, the topic hashes may be strictly hierarchical where one character of a topic hash corresponds to one event category or sub-category (corresponding to a node). In some cases, the topic hashes may be loosely hierarchical, where a query topic hash may return "tagged" topics, such as nodes 814-822.

2.D. Event Tracking Using Preference Learning

Figure 9:
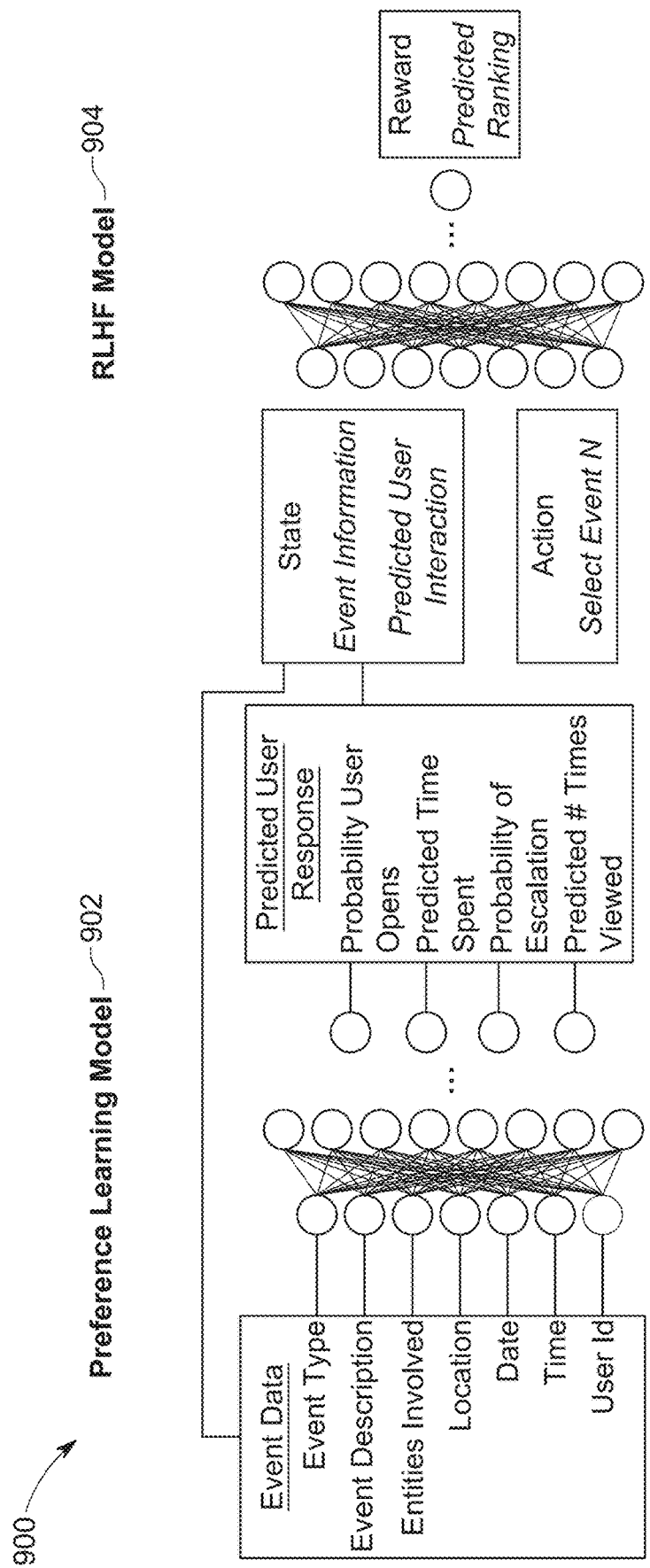
FIG. 9 depicts a flow diagram of a preference learning model and a reinforcement learning model used for event prioritization.

FIG. 9 depicts an exemplary flow diagram 900 of a combination of a preference learning model 902 and a reinforcement learning model 904 used for event prioritization. In some cases, as events are displayed to a user. In some case, user interaction data may be generated for each event based on how the user interacted with the event data via a user interface. User interaction data may capture metrics that act as metrics for how relevant an event is to a given user.

As an example, the server 120 may compute a relevance score in accordance with Equation 1.

$$Sr=a(O)+b(Ts)+c(E)+d(V) \quad \text{Equation 1:}$$

Where: Sr=Relevance Score, O=User Opened, Ts=Time Spent, E=User Escalated, V=Times Viewed, and a, b, c, d=Independent Weights, [0, 1].

Examples of such metrics may include one or more of the following: time the user spent viewing the event; number of times the user viewed the event; whether the user escalated the event for further action; did the user use the user interface to click on the event in order to view it; and/or the like.

In some cases, the user interaction data may be fed as a training dataset to train a deep neural network (DNN) to learn a mapping of event and user information to user interactions with the event. An example of a DNN that can be used is a preferential learning model 902. The preferential learning model 902 may be used to predict how a user would rank preferences among a set of items represented as feature vectors. In addition to the preference learning model 902, other learning models/techniques may be incorporated to aid in leveraging the user interaction data to predict the relevance of a future event for a given user. For example, exponential smoothing may be performed to give more weight to user interaction data associated with recent events. The output of the preferential leaning model 902, which should predict how a user will engage with a future event, may be fed to a relevance function or model that is configured to use such information to output a predicted ranking of relevancy of future events, or in other words, a prediction as to how a user would rank the relevance the events. This ranking may be generated before presenting the event them to the end user.

In some cases, the predicted ranking may assist the system to generate a timeline of events to present to the user, which can be thought of as a storyline (e.g., a narrative generation model may be trained to generate and output the timeline). In some cases, the relevance model may be an RLHF model 904. In some cases, the RLHF model 904 may be equipped for robust datasets. The RLHF model 904 may collect user feedback based on user responses to prompts presented alongside given events (e.g., request for more data, a request to silence a type of event, etc.). This feedback may in turn be used to further train the RLHF 904 to learn a policy to serve data to the user by better representing user preferences (e.g., by identifying ambiguous preferences).

2.E. Flowchart for Event Tracking

Figure 10:
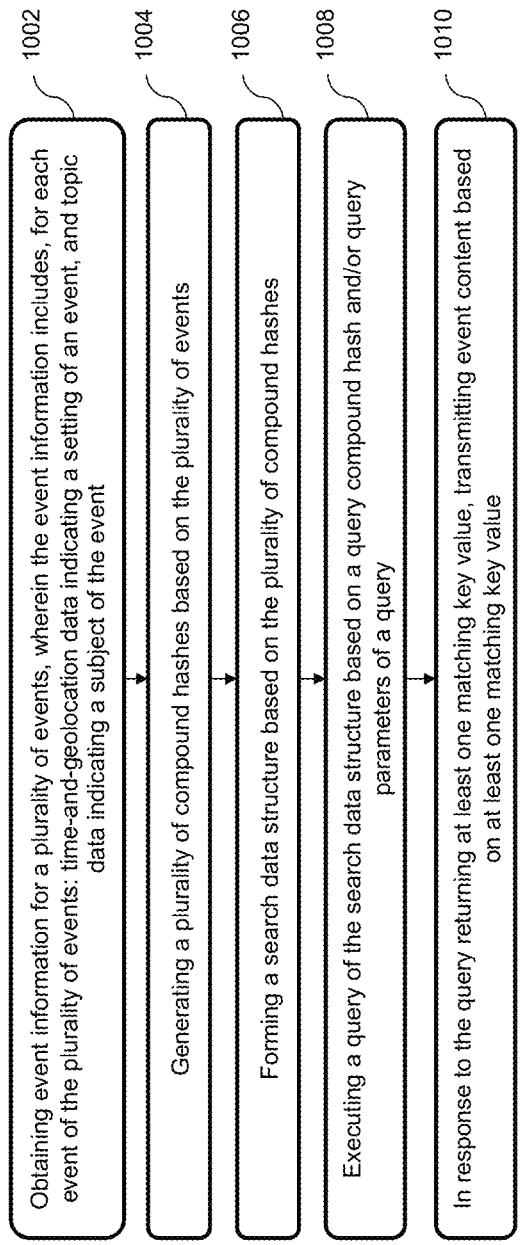
FIG. 10 depicts a flowchart for event tracking.

FIG. 10 depicts an event tracking process flowchart 1000 for event tracking. The event tracking process flowchart 1000 illustrates a sequence of operations that may be performed by the system to track events. The process begins at block 1002, where the system obtains event information for a plurality of events. The event information may include time-and-geolocation data indicating the setting of an event, and topic data indicating the subject of the event. In some cases, the event information may be obtained from a description of an event comprising multimodal data. The multimodal data may include one or combinations of text, image, audio, video, and sensor data. For instance, the text data may represent unstructured, semi-structured, or structured text data.

At block 1004, the system generates a plurality of compound hashes based on the plurality of events. Each compound hash includes a spacetime hash and a topic hash for a specific event. The spacetime hash for a first event is generated based on first time-and-geolocation data for the first event, and the topic hash for the first event is generated from first topic data for the first event.

Next, at block 1006, the system forms a search data structure based on the generated compound hashes. The search data structure is configured to group a plurality of spacetime hashes into subsets and structure a plurality of topic hashes in vectors or groups of subsets. The search data structure is also configured to point to a plurality of keys for a plurality of records associated with the event information based on the plurality of compound hashes.

At block 1008, the system executes a query of the search data structure based on a query compound hash and/or query parameters. The execution of the query includes at least comparing a query spacetime hash with the plurality of spacetime hashes recorded within the search data structure, and comparing a query topic hash with the plurality of topic hashes recorded within the search data structure.

Finally, at block 1010, in response to the query returning at least one matching keys, the system transmits event content based on the at least one matching keys. The event content may include data from records associated with the at least one matching keys.

In some aspects, the operations further include inputting the multimodal data into a multi-model machine learning model or a plurality of machine learning models to determine attributes of an event. The plurality of machine learning models may include one or combinations of a natural language processing model, a neural network, an embedding model, a large language model, an object detection model, an optical character recognition model, and/or a transcription model. For instance, the natural language processing model may perform named entity detection/resolution and parts-of-speech detection.

The event tracking process flowchart 1000 may utilize a variety of machine learning models to process and interpret the event information. In some cases, the system may employ a natural language processing model, a neural network, an embedding model, a large language model, an object detection model, an optical character recognition model, and/or a transcription model. These models may be used individually or in combination, depending on the nature and format of the event information.

For instance, a natural language processing model may be used to analyze text-based event information. This model may perform tasks such as named entity detection/resolution (NER) and parts-of-speech detection. Named entity detection/resolution may involve identifying and classifying entities such as people, places, and organizations within the text. Parts-of-speech detection may involve identifying the grammatical roles of words in the text, which can help to determine relationships between entities and provide a more nuanced understanding of the event.

At block 1006, the system forms a search data structure based on the generated compound hashes. This search data structure may take the form of a trie or a bitmap, depending on the specific requirements of the system. In some cases, a trie structure may be used, where the subsets of the plurality of topic hashes are grouped based on a mapping of event categories. This mapping may involve creating a hierarchical structure of event categories, where each event category has parent and/or child relationships with specific other event categories. This hierarchical structure can help to organize and categorize the events in a meaningful and efficient way.

For example, an event category such as "Violence" may be a parent category, with child categories such as "Battle" and "Explosion". Each of these child categories may further have their own child categories, creating a multi-level hierarchy of event categories. This hierarchical structure can allow for a more nuanced and detailed categorization of events, which can in turn improve the accuracy and efficiency of the event tracking process.

In some cases, the system may use a loose hierarchy, where event categories are not strictly hierarchical but instead have multiple non-hierarchical tags associated with them. This can allow for a more flexible and adaptable categorization system, which can be particularly useful in complex or rapidly changing situations.

The event tracking process flowchart 1000 as depicted in FIG. 10 provides a comprehensive and flexible system for tracking and categorizing events. By utilizing a variety of machine learning models and a hierarchical categorization system, the system can effectively handle a wide range of event information and accurately track and categorize events.

In some aspects, the system may organize event categories in a hierarchical manner. This hierarchical organization may be either strict or loose, depending on the specific requirements of the system. In a strict hierarchy, each event category corresponds to one character of a topic hash, and each event category has a parent-child relationship with specific other event categories. For instance, a parent event category within the hierarchy may be associated with at least one child event category, each representing a more specific sub-category of the parent category. This hierarchical organization allows for a structured and systematic categorization of events, which can facilitate efficient event tracking and correlation.

In contrast, in a loose hierarchy, the system may include at least one loose event category branch that stores a plurality of tags. These tags may represent non-hierarchical categories or sub-categories associated with an event. Each topic hash may be grouped to at least one event category and, for the at least one loose event category branch, the topic hash may be grouped to at least one tag. This loose categorization allows for a more flexible and adaptable categorization system, which can be particularly useful in complex or rapidly changing situations.

The grouping of topic hashes to event categories or tags may be based on various methods. In some cases, the system may use a keyword match, where the topic hash is grouped to an event category or tag based on matching keywords. In other cases, the system may use a neural network inference, where a neural network model is trained to predict the appropriate event category or tag for a given topic hash or topic data. In yet other cases, the system may use an embedding, where the topic hash is represented as a vector in a high-dimensional space, and the system groups the topic hash to an event category or tag based on the proximity of the vector to vectors representing different event categories or tags in the high-dimensional space.

In this way, the system can effectively categorize and track events across multiple data sources and modes, taking into account the varying geospatial, temporal, and categorical precision of event descriptions. This can facilitate efficient and accurate event correlation, thereby enhancing the system's ability to identify and resolve events across diverse and complex data landscapes.

In some aspects, executing a query of the search data structure, as depicted in block 1008 of the event tracking process flowchart 1000, involves comparing a query spacetime hash with the plurality of spacetime hashes recorded within the search data structure, and comparing a query topic hash with the plurality of topic hashes recorded within the search data structure. The query spacetime hash and the query topic hash may be components of a query compound hash, which represents a specific event of interest. The query compound hash may be generated based on query parameters, which may include specific time-and-geolocation data and topic data related to the event of interest.

In some cases, matching the query spacetime hash with the at least one spacetime hash involves prefix matching. Prefix matching is a technique that allows for variable precision hashes to return as matching. For example, a spacetime hash for an event occurring at a specific location may return as a location match for an event occurring in a broader geographical area if the prefix of the spacetime hashes match. This allows for flexibility in matching events that occur in the same general area, even if the exact geospatial coordinates are not identical.

Executing the query of the search data structure may also involve selecting a subset of the plurality of compound hashes based on the query spacetime hash, as depicted in block 1006 of the event tracking process flowchart 1000. This subset of compound hashes represents events that occurred within the same time-and-geolocation parameters as the event of interest. The system then compares the query topic hash to the topic hashes that correspond to this subset of compound hashes. If the query topic hash matches one or more of the subset of topic hashes, the system returns the at least one matching keys. These matching keys point to records associated with the event information that matches the query parameters.

In some aspects, the event content transmitted by the system in response to the query returning at least one matching keys, as depicted in block 1010 of the event tracking process flowchart 1000, includes data from records associated with the at least one matching keys. This event content may include detailed information about the matching events, such as the time-and-geolocation data, topic data, and any other relevant data associated with the events. This allows the user to access comprehensive information about events that match their query parameters, facilitating efficient and accurate event tracking and correlation.

In some aspects, the event tracking process flowchart 1000 may further include processing data from records associated with the at least one matching keys using a narrative generation model to generate event content. The narrative generation model may be configured to generate a semantic description of relevant events as the event content. This semantic description may provide a user-friendly summary or overview of the event, making it easier for users to understand and interpret the event information.

The narrative generation model may include a natural language processing model (NLP model). The NLP model may be trained based on training data of textual content for sample events. This training data may include a variety of text-based event descriptions, such as news articles, social media posts, and other forms of textual, image, video, or audio content that describe events. The NLP model may be trained to generate a semantic description of an event based on the event information, including the time-and-geolocation data and the topic data.

In some cases, the query may be requested from a user of the system, and the system may further process the event content using a preferential learning model. The preferential learning model may be configured to generate and rank scores for discrete event tokens to predict how relevant an event is to the user. This can help to prioritize the events that are presented to the user, ensuring that the user is shown the events that are likely to be of greatest interest or relevance to them.

The preferential learning model may be trained based on a plurality of metrics that indicate how the user has interacted with the system previously. These metrics may include, for example, the number of times the user has viewed the event and the duration of time the user viewed the event. By analyzing these metrics, the preferential learning model can learn to predict the user's preferences and interests, and can use this information to rank the relevance of future events.

In this way, the event tracking process flowchart 1000 can effectively track and categorize events, and can present the events to the user in a manner that is tailored to the user's preferences and interests. This can enhance the user's experience and can improve the efficiency and effectiveness of the event tracking process.

In some aspects, the system may perform an event fusion process to identify and resolve events across multiple modes of data with varying geospatial, temporal, and categorical precision. This process may involve correlating event descriptions with each other and with other entities of interest, such as specific locations or sensors.

In some aspects, the system may perform event relationship tracking. For instance, events may be related to each other spatio-temporally or topically without being fused. These relationships may be represented in a graph-based system, such as a graph database. Examples Include:

(1) Events that match topically and temporally, but not geospatially. As an example simultaneous air strikes in Kyiv, Zaporizhzhia, and Bakhmut. These would be linked via a "topic and time" relationship.

(2) Events that match Geospatially and Topically. As an example "A convoy passed through location X at 08:00 this morning" would be linked to the same Convoy event at X that occurred 2 weeks ago.

(3) Events that match spatio-temporally, but not topically. As an example malware attack at X corresponded with an air strike at X.

Upon receiving a new event description, the system may first perform a spatio-temporal correlation. This involves comparing the geospatial and temporal data encoded in the event description with the corresponding data in the existing events stored in the system. The system may use spacetime hashes, which contain a geohash, timehash, and optionally an altitude hash, to perform this comparison. The precision of each hash is determined by the precision of the source data. For example, an event occurring at a specific latitude, longitude, and altitude would have a corresponding spacetime hash with a precise geohash, timehash, and altitude hash.

The system may then resolve events geospatially and temporally by finding events that have matching spacetime hashes. This may involve a "prefix" match, such that variable precision hashes return as matching. For instance, an event occurring at the White House, represented by the geohash "dqcjqcp", would return as a location match for an event occurring in NW Washington DC with geohash "dqcjq". A "full" event match requires a matching geohash, timehash, altitude hash (if present), and event hash or vector embedding.

In addition to correlating event descriptions with each other, the system may also correlate events with other entities of interest. This may include specific buildings or locations, such as sensitive government facilities, or sensors, such as a security camera that may have captured footage of an event. This correlation may be implemented as a "tripwire" that identifies events that occur within a specific radius of an entity of interest.

In some cases, the system may also perform event fusion, which involves combining multiple event descriptions into a single event. This process may involve comparing the event descriptions based on their geospatial and temporal data, as well as their topic data. If the event descriptions are found to be sufficiently similar, they may be fused into a single event. This fusion process may involve updating the spacetime hash and event hash or vector embedding of the fused event to reflect the combined data from the fused event descriptions.

In some cases, the system may also perform event deduplication, which involves identifying and removing duplicate events from the system. This process may involve comparing the events based on their geospatial and temporal data, as well as their topic data. If two events are found to be sufficiently similar, they may be considered duplicates, and one of them may be removed from the system.

In some cases, the system may also identify relationships between events. These relationships may be based on shared geospatial and temporal data, shared topic data, or other shared attributes. The system may represent these relationships in a graph-based system, such as a graph database. This may be used to provide a visual representation of the relationships between events, which can aid in understanding and interpreting the event data.

In this way, the system can effectively track and categorize events, and can identify and resolve events across diverse and complex data landscapes. This can enhance the system's ability to identify and resolve events across diverse and complex data landscapes, thereby improving the efficiency and accuracy of the event tracking process.

Computer System

Figure 11:
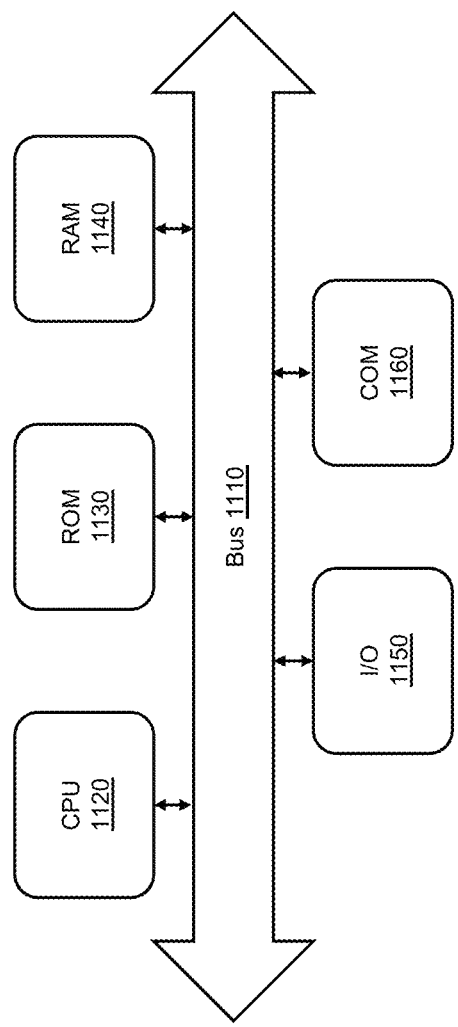
FIG. 11 depicts an example system that may execute techniques presented herein.

FIG. 11 depicts an example system that may execute techniques presented herein. FIG. 11 is a simplified functional block diagram of a computer that may be configured to execute techniques described herein, according to exemplary cases of the present disclosure. Specifically, the computer (or "platform" as it may not be a single physical computer infrastructure) may include a data communication interface 660 for packet data communication. The platform may also include a central processing unit 620, in the form of one or more processors, for executing program instructions. The platform may include an internal communication bus 1110, and the platform may also include a program storage and/or a data storage for various data files to be processed and/or communicated by the platform such as ROM 1130 and RAM 1140, although the system 1100 may receive programming and data via network communications. The system 1100 also may include input and output ports 1150 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Examples

Exemplary embodiments of the systems and methods disclosed herein are described in the numbered paragraphs below.

A1. A system for event tracking, the system comprising: at least one processor; and at least one memory configured to store instructions that, when executed by the at least one processor, cause the at least one processor to perform operations, the operations including: obtaining event information for a plurality of events, wherein the event information includes, for each event of the plurality of events: time-and-geolocation data indicating a setting of an event, and topic data indicating a subject of the event; generating a plurality of compound hashes based on the plurality of events, wherein each compound hash includes a spacetime hash and a topic hash for a specific event, a first spacetime hash for a first event is generated based on first time-andgeolocation data for the first event, and a first topic hash for the first event is generated from first topic data for the first event; forming a search data structure based on the plurality of compound hashes, wherein the search data structure is configured to (a) group a plurality of spacetime hashes into subsets and (b) structure a plurality of topic hashes in vectors or groups of subsets, and the search data structure is configured to point to a plurality of key values for a plurality of records associated with the event information based on the plurality of compound hashes; after the search data structure is generated: obtaining a query that indicates a query compound hash and/or query parameters; executing a query of the search data structure based on the query compound hash and/or query parameters, wherein executing the query includes at least: (i) comparing a query spacetime hash with the plurality of spacetime hashes recorded within the search data structure; and (ii) comparing a query topic hash with the plurality of topic hashes recorded within the search data structure; and in response to the query returning at least one matching key value, transmitting event content based on the at least one matching key value.

A2. The system of A1, wherein the event information is obtained from a description of an event comprising multimodal data.

A3. The system of A2, wherein the multimodal data comprises one or combinations of: (i) text; (ii) image; (iii) audio; (iv) video; and (v) sensor data.

A4. The system of A3, wherein the text represents unstructured, semi-structured, or structured text data.

A5. The system of A2, wherein the operations further include inputting the multimodal data into a multi-model machine learning model or a plurality of machine learning models to determine attributes of an event.

A6. The system of A5, wherein the plurality of machine learning models may include one or combinations of: a natural language processing model, a neural network, an embedding model, a large language model, an object detection model, an optical character recognition model, and/or a transcription model.

A7. The system of A6, wherein the natural language processing model may perform named entity detection/resolution (NER) and parts-of-speech detection.

A8. The system of any of A1-A7, wherein the search data structure includes at least a trie or a bitmap.

A9. The system of A8, wherein the search data structure is a trie, wherein the subsets of the plurality of topic hashes are grouped based on a mapping of event categories.

A10. The system of A9, wherein the mapping of event categories includes a hierarchy whereby each event category has parent and/or child relationships with specific other event category(s).

A11. The system of A10, wherein a parent event category within the hierarchy is associated with at least one child event category.

A12. The system of A10, wherein the hierarchy is organized using a strict format or a loose format.

A13. The system of A12, wherein the loose format includes at least one loose event category branch that stores a plurality of tags.

A14. The system of A13, wherein each topic hash is grouped to at least one event category and, for the at least one loose event category branch, the topic hash is grouped to at least one tag.

A15. The system of A14, wherein grouping to the at least one event category or to at least one tag is based on a keyword match, a neural network inference, or an embedding.

A16. The system of any of A1-A15, wherein in order to return the at least one matching key value in response to the query: (i) the query spacetime hash matches with at least one spacetime hash of the plurality of spacetime hashes contained within the search data structure and (ii) the query topic hash matches with at least one of the plurality of topic hashes contained within the search data structure.

A17. The system of A16, wherein matching the query spacetime hash with the at least one spacetime hash involves prefix matching.

A18. The system of any of A1-A17, wherein executing the query of the search data structure comprises at least: selecting a subset of the plurality of compound hashes based on the query spacetime hash; comparing the query topic hash to topic hashes that correspond to the subset; and returning the at least one matching key value in response to the query topic hash matching one or more of the subset.

A19. The system of any of A1-A18, wherein the event content includes data from records associated with the at least one matching key value.

A20. The system of any of A1-A19, wherein the operations further include: process data from records associated with the at least one matching key value using a narrative generation model to generate the event content, wherein the narrative generation model is configured to generate a semantic description of relevant events as the event content.

A21. The system of A20, wherein the narrative generation model includes a natural language processing model (NLP model), wherein the NLP model is trained based on training data of textual content for sample events.

A22. The system of A20, wherein the query is requested from a user of the system, and the system is further configured to process the event content using a preferential learning model configured to generate and rank scores for discrete event tokens to predict how relevant an event is to the user.

A23. The system of A22, wherein the preferential learning model has been trained based on a plurality of metrics, wherein the plurality of metrics indicate how the user has interacted with the system previously, including at least: (i) a number of views of the event for the user; and (ii) duration of time the user viewed the event.

A24. A computer-implemented method, comprising: obtaining event information for a plurality of events, wherein the event information includes, for each event of the plurality of events: time-and-geolocation data indicating a setting of an event, and topic data indicating a subject of the event; generating a plurality of compound hashes based on the plurality of events, wherein each compound hash includes a spacetime hash and a topic hash for a specific event, a first spacetime hash for a first event is generated based on first time-and-geolocation data for the first event, and a first topic hash for the first event is generated from first topic data for the first event; forming a search data structure based on the plurality of compound hashes, wherein the search data structure is configured to (a) group a plurality of spacetime hashes into subsets and (b) structure a plurality of topic hashes in vectors or groups of subsets, and the search data structure is configured to point to a plurality of key values for a plurality of records associated with the event information based on the plurality of compound hashes; after the search data structure is generated: obtaining a query that indicates a query compound hash and/or query parameters; executing a query of the search data structure based on the query compound hash and/or query parameters, wherein executing the query includes at least: (i) comparing a query spacetime hash with the plurality of spacetime hashes recorded within the search data structure; and (ii) comparing a query topic hash with the plurality of topic hashes recorded within the search data structure; and in response to the query returning at least one matching key value, transmitting event content based on the at least one matching key value.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for event tracking, the system comprising:
   at least one processor; and
   at least one memory configured to store instructions that, when executed by the at least one processor, cause the at least one processor to perform operations, the operations including:
   obtaining event information for a plurality of events, wherein the event information includes, for each event of the plurality of events: time-and-geolocation data indicating a setting of an event, and topic data indicating a subject of the event;
   generating a plurality of compound hashes based on the plurality of events,
      wherein each compound hash includes a spacetime hash and a topic hash for a specific event,
      a first spacetime hash for a first event is generated based on first time-and-geolocation data for the first event, and
      a first topic hash for the first event is generated from first topic data for the first event;
   forming a search data structure based on the plurality of compound hashes,
      wherein the search data structure is configured to (a) group a plurality of spacetime hashes into subsets and (b) structure a plurality of topic hashes in vectors or groups of subsets, and
      the search data structure is configured to point to a plurality of key values for a plurality of records associated with the event information based on the plurality of compound hashes;
   after the search data structure is generated:
      obtaining a query that indicates a query compound hash and/or query parameters;
      executing a query of the search data structure based on the query compound hash and/or query parameters, wherein executing the query includes at least: (i) comparing a query spacetime hash with the plurality of spacetime hashes recorded within the search data structure; and (ii) comparing a query topic hash with the plurality of topic hashes recorded within the search data structure; and
      in response to the query returning at least one matching key value, transmitting event content based on the at least one matching key value.

2. The system of claim 1, wherein the event information is obtained from a description of an event comprising multimodal data.

3. The system of claim 2, wherein the multimodal data comprises one or combinations of: (i) text; (ii) image; (iii) audio; (iv) video; and (v) sensor data.

4. The system of claim 3, wherein the text represents unstructured, semi-structured, or structured text data.

5. The system of claim 2, wherein the operations further include inputting the multimodal data into a multi-model machine learning model or a plurality of machine learning models to determine attributes of an event.

6. The system of claim 5, wherein the plurality of machine learning models may include one or combinations of: a natural language processing model, a neural network, an embedding model, a large language model, an object detection model, an optical character recognition model, and/or a transcription model.

7. The system of claim 6, wherein the natural language processing model may perform named entity detection/resolution (NER) and parts-of-speech detection.

8. The system of claim 1, wherein the search data structure includes at least a trie or a bitmap.

9. The system of claim 8, wherein the search data structure is a trie, wherein the subsets of the plurality of topic hashes are grouped based on a mapping of event categories.

10. The system of claim 9, wherein the mapping of event categories includes a hierarchy whereby each event category has parent and/or child relationships with specific other event category(s).

11. The system of claim 10, wherein a parent event category within the hierarchy is associated with at least one child event category.

12. The system of claim 10, wherein the hierarchy is organized using a strict format or a loose format.

13. The system of claim 12, wherein the loose format includes at least one loose event category branch that stores a plurality of tags.

14. The system of claim 13, wherein each topic hash is grouped to at least one event category and, for the at least one loose event category branch, the topic hash is grouped to at least one tag.

15. The system of claim 14, wherein grouping to the at least one event category or to at least one tag is based on a keyword match, a neural network inference, or an embedding.

16. The system of claim 1, wherein in order to return the at least one matching key value in response to the query: (i) the query spacetime hash matches with at least one spacetime hash of the plurality of spacetime hashes contained within the search data structure and (ii) the query topic hash matches with at least one of the plurality of topic hashes contained within the search data structure.

17. The system of claim 16, wherein matching the query spacetime hash with the at least one spacetime hash involves prefix matching.

18. The system of claim 1, wherein executing the query of the search data structure comprises at least:
   selecting a subset of the plurality of compound hashes based on the query spacetime hash;
   comparing the query topic hash to topic hashes that correspond to the subset; and
   returning the at least one matching key value in response to the query topic hash matching one or more of the subset.

19. The system of claim 1, wherein the event content includes data from records associated with the at least one matching key value.

20. A computer-implemented method, comprising:
   obtaining event information for a plurality of events, wherein the event information includes, for each event of the plurality of events: time-and-geolocation data indicating a setting of an event, and topic data indicating a subject of the event;
   generating a plurality of compound hashes based on the plurality of events, wherein each compound hash includes a spacetime hash and a topic hash for a specific event,
a first spacetime hash for a first event is generated based on first time-and-geolocation data for the first event, and
a first topic hash for the first event is generated from first topic data for the first event;

forming a search data structure based on the plurality of compound hashes,
wherein the search data structure is configured to (a) group a plurality of spacetime hashes into subsets and (b) structure a plurality of topic hashes in vectors or groups of subsets, and
the search data structure is configured to point to a plurality of key values for a plurality of records associated with the event information based on the plurality of compound hashes;

after the search data structure is generated:
obtaining a query that indicates a query compound hash and/or query parameters;
executing a query of the search data structure based on the query compound hash and/or query parameters, wherein executing the query includes at least: (i) comparing a query spacetime hash with the plurality of spacetime hashes recorded within the search data structure; and (ii) comparing a query topic hash with the plurality of topic hashes recorded within the search data structure; and
in response to the query returning at least one matching key value, transmitting event content based on the at least one matching key value.

* * * * *